US009088377B2

(12) United States Patent
Eddy et al.

(10) Patent No.: US 9,088,377 B2
(45) Date of Patent: Jul. 21, 2015

(54) METHODS AND SYSTEMS FOR CALIBRATING A NETWORK SWITCH

(71) Applicant: OnPath Technologies Inc., East Marlton, NJ (US)

(72) Inventors: Richard A. Eddy, Marlton, NJ (US); Larry Cantwell, Moorestwon, NJ (US)

(73) Assignee: OnPath Technologies Inc., East Marlton, NJ (US)

( * ) Notice: Subject to any disclaimer, the term of this patent is extended or adjusted under 35 U.S.C. 154(b) by 0 days.

(21) Appl. No.: 14/281,754

(22) Filed: May 19, 2014

(65) Prior Publication Data

US 2014/0254397 A1    Sep. 11, 2014

Related U.S. Application Data

(63) Continuation of application No. 13/012,752, filed on Jan. 24, 2011, now Pat. No. 8,743,715.

(51) Int. Cl.
| | |
|---|---|
| *H04J 3/06* | (2006.01) |
| *H04L 7/10* | (2006.01) |
| *H04L 12/26* | (2006.01) |
| *H04L 12/933* | (2013.01) |
| *H04L 12/24* | (2006.01) |
| *H04J 3/14* | (2006.01) |

(52) U.S. Cl.
CPC .................. *H04J 3/0685* (2013.01); *H04L 7/10* (2013.01); *H04L 43/50* (2013.01); *H04L 49/101* (2013.01); *H04J 3/14* (2013.01); *H04L 41/0866* (2013.01)

(58) Field of Classification Search
None
See application file for complete search history.

(56) References Cited

U.S. PATENT DOCUMENTS

| | | | |
|---|---|---|---|
| 5,878,030 A | 3/1999 | Norris | |
| 6,356,532 B1 | 3/2002 | Richardson et al. | |
| 6,895,528 B2 | 5/2005 | Cantwell et al. | |
| 6,917,630 B1 | 7/2005 | Russell et al. | |
| 6,982,974 B1 * | 1/2006 | Saleh et al. | 370/386 |
| 7,072,355 B2 | 7/2006 | Kizer | |
| 7,095,789 B2 * | 8/2006 | Ware et al. | 375/257 |
| 7,245,587 B2 | 7/2007 | Phaal | |
| 7,254,114 B1 | 8/2007 | Turner et al. | |
| 7,406,101 B1 | 7/2008 | Obeidat et al. | |
| 7,515,537 B2 | 4/2009 | Paul et al. | |
| 7,606,150 B2 | 10/2009 | Paul et al. | |
| 7,660,330 B1 | 2/2010 | Shmilovici | |
| 7,835,288 B2 | 11/2010 | Cantwell et al. | |
| 2002/0122223 A1 | 9/2002 | Gallant et al. | |

(Continued)

OTHER PUBLICATIONS

Inrange Technologies, "NetLook Installation/User's Guide," pp. 1-187, 2001.
Freescale Semiconductor, MPC8358E, PowerQUICCTM II Pro Processor, Revision 2.1 PBGA Silicon Hardware Specifications, Document No. MPC8358EEC, Rev. 1, Dec. 2007, pp. 1-96.
Vitesse, "10.709 Gbps 144×144 Asynchronous Crosspoint Switch," VSC3144-11 Product Brief, © 2010, pp. 2.

(Continued)

*Primary Examiner* — Min Jung
(74) *Attorney, Agent, or Firm* — Morgan, Lewis & Bockius LLP

(57) ABSTRACT

A network switch includes first and second clock-and-data-recovery (CDR) circuits, a cross-bar switch electrically coupling the first and second CDR circuits, and a test pattern generation circuit electrically coupled to the first CDR circuit. The test pattern generation circuit is configured to generate a test pattern and transmit the test pattern from the first CDR circuit to the second CDR circuit via the cross-bar switch. The network switch also includes a test pattern checking circuit electrically coupled to the second CDR circuit and configured to verify the test pattern received at the second CDR circuit.

19 Claims, 15 Drawing Sheets

(56) References Cited

U.S. PATENT DOCUMENTS

| | | |
|---|---|---|
| 2003/0112801 A1 | 6/2003 | Calle et al. |
| 2003/0118006 A1 | 6/2003 | Yang et al. |
| 2004/0151173 A1 | 8/2004 | Preisach |
| 2004/0153931 A1 | 8/2004 | Cao et al. |
| 2005/0086563 A1 | 4/2005 | Carballo |
| 2005/0249126 A1 | 11/2005 | Chang et al. |
| 2007/0058641 A1 | 3/2007 | Cicchetti et al. |
| 2007/0143465 A1 | 6/2007 | Gonzalez et al. |
| 2007/0152783 A1 | 7/2007 | Krumme et al. |
| 2008/0010568 A1 | 1/2008 | Kushnick |
| 2009/0034669 A1* | 2/2009 | Hampel et al. ............ 375/354 |
| 2009/0141719 A1* | 6/2009 | Roy et al. ............ 370/390 |
| 2013/0100998 A1 | 4/2013 | Bae et al. |

OTHER PUBLICATIONS

Vitesse, "11.5 Gbps 16×16 Crosspoint Switch," VSC3316 Product Brief, © 2008-2010, pp. 2.

Vitesse, "Quad Port 8.5 Gbps to 11.3 Gbps CDR with EDC," VSC8247 Product Brief, © 2010, pp. 2.

Vitesse, "Quad Port 8.5 Gbps to 11.3 Gbps CDR with EDC and KR Output," VSC8248 Product Brief, © 2010, pp. 2.

Mindspeed, "M21141/61 4.25 Gbps 72×72/144×144 Crosspoint Switch," © 2009, pp. 2.

Broadcom, "10-GPBS Transceiver with 10G Clock, Bus Skew, and Limiting Amplifier," BCM8152 Product Brief, © 2006, pp. 2.

* cited by examiner

METHODS AND SYSTEMS FOR CALIBRATING A NETWORK SWITCH

RELATED APPLICATION

This application is a continuation of U.S. patent application Ser. No. 13/012,752, filed Jan. 24, 2011, entitled "Methods and Systems for Calibrating a Network Switch," which is incorporated by reference herein in its entirety.

TECHNICAL FIELD

The disclosed embodiments relate generally to network switches, and more particularly, to methods and systems for tuning a network switch (e.g., a physical layer switch).

BACKGROUND

Calibrating a network switch (e.g., a physical layer switch) to provide reliable signal transmission between respective ports presents significant challenges. For example, noise, cross-talk, and jitter all cause signal degradation. Also, as line rates increase to 10 Gbps and beyond, even slight differences in trace lengths and impedances can prevent proper switching if not accounted for during calibration.

SUMMARY

Disclosed embodiments allow for automated tuning of a network switch to compensate for such problems as noise, cross-talk, jitter, and differences in circuit topology. For example, a physical layer switch that provides user-configurable dedicated communication paths between respective ports is tuned in an automated manner.

In some embodiments, a physical layer switch includes first and second clock-and-data-recovery (CDR) circuits, a cross-bar switch to couple the first and second CDR circuits and thereby create a dedicated communication path between the first CDR circuit and the second CDR circuit, and a first test pattern generation circuit electrically coupled with the first CDR circuit. The first test pattern generation circuit is configured to generate a test pattern and transmit the test pattern from the first CDR circuit to the second CDR circuit via the cross-bar switch. The physical layer switch also includes a first test pattern checking circuit, electrically coupled with the second CDR circuit, to verify the test pattern received at the second CDR circuit.

In some embodiments, a network switch includes a backplane and a plurality of port cards connected to the backplane. Each port card includes a plurality of ports, a cross-bar switch, and a first port CDR circuit electrically coupled between one or more ports of the plurality of ports and the cross-bar switch. The first port CDR circuit recovers first signals received from the one or more ports and transmits the recovered first signals to the cross-bar switch, and recovers second signals received from the cross-bar switch and transmits the recovered second signals to the one or more ports. Each port card also includes a first test pattern generation circuit, electrically coupled with the first port CDR circuit, to generate a test pattern and transmit the test pattern from the first port CDR circuit to the cross-bar switch; backplane CDR circuitry, electrically coupled to the cross-bar switch, to recover third signals received via the backplane and to transmit the recovered third signals to the cross-bar switch; and a first test pattern checking circuit, electrically coupled with the backplane CDR circuitry, to verify test patterns received at the backplane CDR circuitry from other port cards of the plurality of port cards.

In some of these embodiments, the first port CDR circuit includes configuration logic to tune one or more adjustable parameters of the first port CDR circuit, and the physical layer switch further includes control circuitry that is electrically coupled to the first test pattern generation circuits, the first test pattern checking circuits, and the first CDR circuits of the plurality of port cards. The control circuitry commands the first port CDR circuit of a respective port card to tune at least one of the one or more adjustable parameters of the first port CDR circuit based on results from the first test pattern checking circuit of another port card of the plurality of port cards. Furthermore, in some embodiments, the control circuitry includes one or more processors and memory storing one or more programs configured for execution by the one or more processors. For example, the one or more processors include a plurality of respective controllers situated on respective port cards of the plurality of port cards. The one or more programs include instructions to command the first port card to tune the one or more adjustable parameters of the first port CDR circuit based on results from the first test pattern checking circuit. In some implementations, the one or more programs further include instructions to run the first test pattern generation circuit of each port card of the plurality of port cards in parallel.

In some of these embodiments, each port card of the plurality of port cards includes a plurality of port CDR circuits, including the first port CDR circuit, electrically coupled between the plurality of ports and the cross-bar switch. The plurality of port CDR circuits recovers a first plurality of signals received from the plurality of ports and transmits the recovered first plurality of signals to the cross-bar switch, and also recovers a second plurality of signals received from the cross-bar switch and transmits the recovered second plurality of signals to the plurality of ports. Each port card of the plurality of port cards also includes a plurality of test pattern generation circuits, including the first test pattern generation circuit, electrically coupled with the plurality of port CDR circuits. The plurality of test pattern generation circuits generates test patterns and transmits the test patterns from the plurality of port CDR circuits to the cross-bar switch, and the cross-bar switch provides the test patterns to other port cards via the backplane. Each port card of the plurality of port cards further includes a plurality of test pattern checking circuits, electrically coupled with the backplane CDR circuitry, to verify test patterns received at the backplane CDR circuitry from other port cards of the plurality of port cards. The plurality of test pattern checking circuits includes the first test pattern checking circuit. Furthermore, in some embodiments, the pluralities of port CDR circuits of the port cards each include configuration logic to tune one or more adjustable parameters of the port CDR circuits, and the physical layer switch also includes control circuitry that is electrically coupled to the pluralities of test pattern generation circuits, the pluralities of test pattern checking circuits, and the pluralities of port CDR circuits. The control circuitry commands the pluralities of port CDR circuits to tune at least one of the one or more adjustable parameters of the port CDR circuits based on results from the pluralities of test pattern checking circuits.

In some embodiments, a network switch includes a middle-stage switching card and a plurality of port cards electrically coupled with the middle-stage switching card. Each port card includes a plurality of ports, a first cross-bar switch, and a first port CDR circuit electrically coupled between one or more ports of the plurality of ports and the first cross-bar switch. The first port CDR circuit forwards signals from the one or more ports to the first cross-bar switch and forwards signals from the first cross-bar switch to the one or more ports. Each port card also includes a first test pattern generation circuit, electrically coupled with the first port CDR circuit, to generate a test pattern and transmit the test pattern from the first port CDR circuit to the first cross-bar switch; driver circuitry, electrically coupled to the first cross-bar switch, to forward signals and the test pattern from the first cross-bar switch to the middle-stage switching card; CDR circuitry, electrically coupled to the first cross-bar switch, to forward signals from the middle-stage switching card to the cross-bar switch; and a first test pattern checking circuit, electrically coupled with the CDR circuitry, to verify test patterns received at the CDR circuitry from the middle-stage switching card. The middle-stage switching card includes a second cross-bar switch and a plurality of CDR circuits, each of which is electrically coupled to the second cross-bar switch and forwards signals from a respective port card to the second cross-bar switch.

In some embodiments, a method of calibrating a network switch includes transmitting a test pattern along a data path segment from a first CDR circuit, through a cross-bar switch, to a second CDR circuit and determining whether the test pattern as received at the second CDR circuit satisfies a predefined criterion. In response to a determination that the test pattern as received at the second CDR circuit does not satisfy the predefined criterion, an adjustable parameter of a component of the data path segment is tuned.

In some embodiments, a method of calibrating a network switch is performed for a switch that includes a backplane and a plurality of port cards. Each port card of the plurality of port cards is connected to the backplane and includes a first port CDR circuit, backplane CDR circuitry, and a cross-bar switch coupling the backplane CDR circuitry with the first port CDR circuit. The method includes transmitting a first test pattern along a first data path segment from the first port CDR circuit of a first port card of the plurality of port cards to the backplane CDR circuitry of a second port card of the plurality of port cards and determining whether the first test pattern as received at the backplane CDR circuitry of the second port card satisfies a predefined criterion. In response to a determination that the first test pattern as received at the backplane CDR of the second port card does not satisfy the predefined criterion, an adjustable parameter of a component of the first data path segment is tuned.

In some of these embodiments, while transmitting the first test pattern along the first data path segment, a second test pattern is transmitted along a third data path segment from the first port CDR circuit of the second port card to the backplane CDR circuitry of the first port card. A determination is made as to whether the second test pattern as received at the backplane CDR circuitry of the first port card satisfies the predefined criterion. In response to a determination that the second test pattern as received at the backplane CDR circuitry of the first port card does not satisfy the predefined criterion, an adjustable parameter of a component of the third data path segment is tuned. Furthermore, in some embodiments the transmitting and determining operations are repeatedly performed for the first and third data path segments, and adjustable parameters of respective components of the first and third data path segments are successively tuned until a determination is made that the first test pattern as received at the backplane CDR circuitry of the second port card satisfies the predefined criterion and the second test pattern as received at the backplane CDR circuitry of the first port card satisfies the predefined criterion.

In some of these embodiments, the second test pattern is provided to the backplane CDR circuitry of a third port card via a fourth data path segment, while the second test pattern is being transmitted along the third data path segment. The second test pattern is received at the backplane CDR circuitry of the third port card without determining whether the second test pattern satisfies the predefined criterion. Furthermore, on each port card of the first, second, and third port cards, a respective test pattern received at the backplane CDR circuitry is forwarded to the first port CDR circuit of the port card.

In some of these embodiments, each port card of the plurality of port cards includes a plurality of port CDR circuits, including the first port CDR circuit. The switch includes a plurality of data path segments between respective port CDR circuits and backplane CDR circuitry. While the first test pattern is being transmitted along the first data path segment and the second test pattern is being transmitted along the third data path segment, test patterns are transmitted along all other data path segments of the plurality of data path segments.

In some embodiments, a method of calibrating a network switch is performed for a switch that includes a first port card. The first port card includes a port CDR circuit, backplane CDR circuitry, and a cross-bar switch coupling the backplane CDR circuitry with the port CDR circuit. The method includes transmitting a first test pattern along a data path segment from the backplane CDR circuitry to the port CDR circuit and verifying the first test pattern at the port CDR circuit, to determine whether the first test pattern as received at the port CDR circuit satisfies a predefined criterion. In response to a determination that the first test pattern as received at the port CDR circuit does not satisfy the predefined criterion, an adjustable parameter of a component of the first data path segment is tuned.

In some of these embodiments, while transmitting the first test pattern, a second test pattern is transmitted along a second data path segment originating at the port CDR circuit and passing through the cross-bar switch. Furthermore, in some embodiments the switch further includes a second port card electrically coupled to the first port card. Transmitting the first test pattern includes receiving the first test pattern from the second port card at the backplane CDR circuitry and forwarding the first test pattern along the first data path segment to the port CDR circuit. Transmitting the second test pattern includes forwarding the second test pattern from the first port card to the second port card, while receiving the first test pattern from the second port card.

In some embodiments, a method of calibrating a network switch is performed for a switch that includes a plurality of port cards and a middle-stage switching card. Respective port cards of the plurality of port cards are electrically coupled to the middle-stage switching card and each include a first port CDR circuit and a first cross-bar switch. The middle-stage switching card includes a plurality of CDR circuits electrically coupled to respective port cards. The method includes transmitting a first test pattern along a first data path segment from the first port CDR circuit of a first port card of the plurality of port cards, through the first cross-bar switch, to a respective CDR circuit of the plurality of CDR circuits of the middle-stage switching card and determining whether the first test pattern as received at the respective CDR circuit satisfies a predefined criterion. In response to a determination that the first test pattern as received at the respective CDR circuit does not satisfy the predefined criterion, an adjustable parameter of a component of the first data path segment is tuned.

BRIEF DESCRIPTION OF THE DRAWINGS

Like reference numerals refer to corresponding parts throughout the drawings.

DESCRIPTION OF EMBODIMENTS

Reference will now be made in detail to various embodiments, examples of which are illustrated in the accompanying drawings. In the following detailed description, numerous specific details are set forth in order to provide a thorough understanding of the present inventions. However, the present inventions may be practiced without these specific details. In other instances, well-known methods, procedures, components, and circuits have not been described in detail so as not to unnecessarily obscure aspects of the embodiments.

Figure 1:
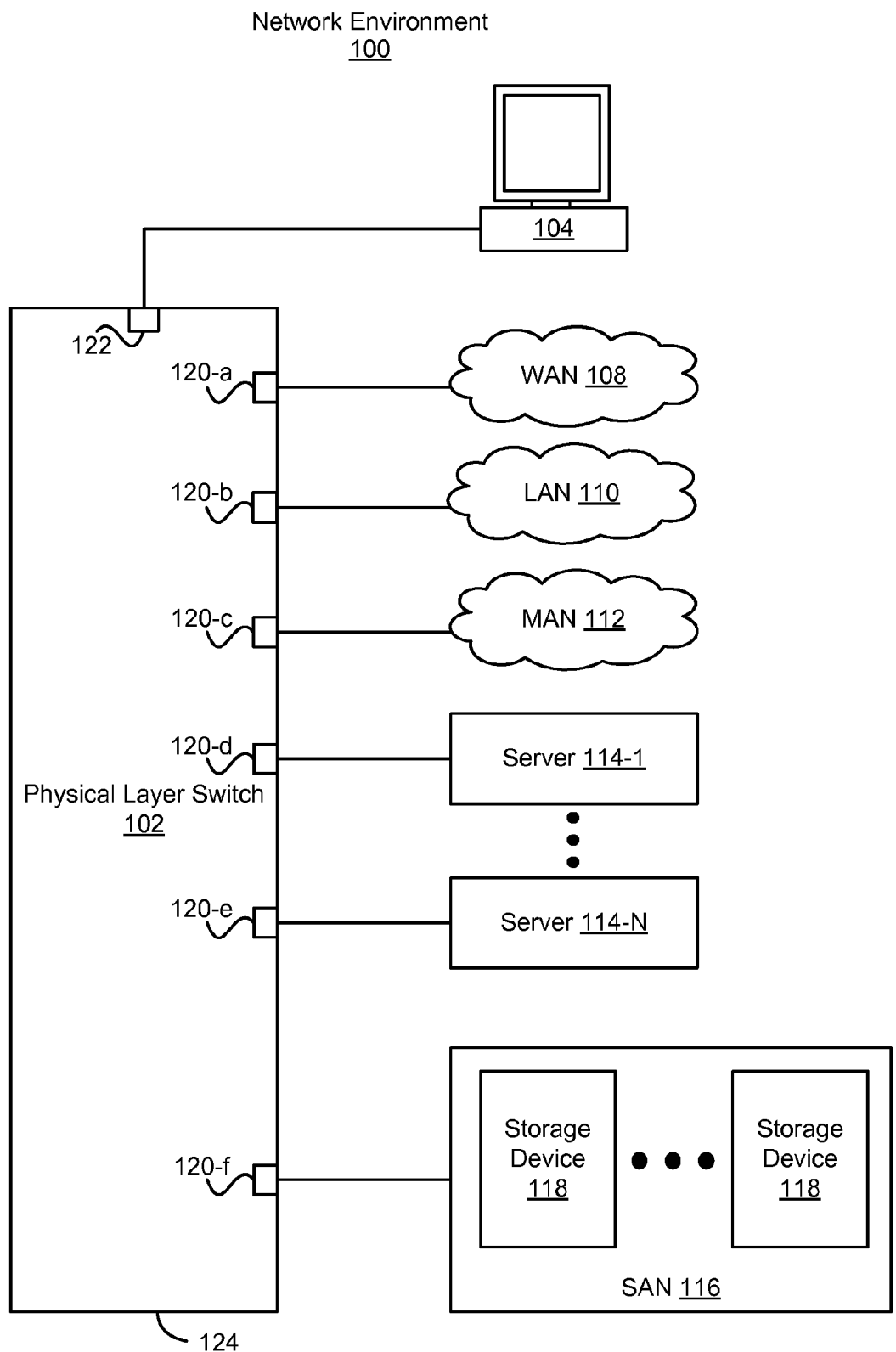
FIG. 1 is a block diagram illustrating a network environment including a physical layer switch in accordance with some embodiments.

FIG. 1 is a block diagram illustrating a network environment 100 including a physical layer switch 102 in accordance with some embodiments. The physical layer switch 102 provides user-configurable dedicated communication paths between respective ports 120 (e.g., between an "input port" and one or more "output ports."). (The term "physical layer" refers to Layer 1 of the Open Systems Interconnect (OSI) model.) For example, a user at an external computer 104 may configure the switch 102 via a control port 122 (e.g., an Ethernet port) to create a dedicated circuit connection between an input port and one or more output ports. The terms "input port" and "output port" merely indicate the direction of transmission of a particular signal; in general, the ports are bi-directional. Once the user has created a dedicated circuit connection, the circuit connection persists until the user subsequently reconfigures the switch 102 to disconnect the circuit connection. Physical layer switches thus are distinguishable from switches that determine the output port(s) for packets or frames by examining packet or frame addresses: in a physical layer switch, once a dedicated circuit connection has been created, data received at an input port is automatically directed to the corresponding output port(s). A physical layer switch provides an electronic patch panel that, when used as a replacement to a manual patch panel, eliminates having to rewire the patch panel when reconfiguring network connections.

The physical layer switch 102 provides connections between various electronic devices, such as one or more servers 114-1-114-N, storage devices 118, and/or other peripheral devices. In some embodiments, devices are coupled to the switch 102 through one or more networks, such as a wide-area network (WAN) 108, local-area network (LAN) 110, and/or metropolitan area network (MAN) 112. In some embodiments, the storage devices 118 are arranged in one or more storage area networks (SANs) 116. For example, a respective storage device 118 may correspond to a RAID array or to a logical unit number (LUN) of a RAID array.

Each device (e.g., server 114 or storage device 118) or network (e.g., WAN 108, LAN 110, MAN 112, or SAN 116) connects to the switch 102 through respective ports 120 in a housing 124. In some embodiments, the switch 102 includes at least 48 ports, or 144 ports or more. The ports 120 may support various data transmission protocols, such as Fibre Channel (FC), Ethernet, FCOE, SONET/SDH protocols, high-definition (HD) television, SDI, FICON, ESCON, iSCSI, and others. The ports 120 also may support various transmission rates (i.e., line rates), such as 1, 2, 4, 8, or 10 Gbps or more. In some embodiments, a respective port 120 may be replaced with a wireless port.

While FIG. 1 shows devices (e.g., server 114 and storage device 118) and networks (e.g., WAN 108, LAN 110, MAN 112, and SAN 116) coupled via a physical layer switch 102, in some embodiments these devices and networks are coupled via a layer 2, layer 3, or layer 4 switch, or via a multi-layer switch that performs switching at a combination of layers 1, 2, 3, and/or 4.

Figure 2:
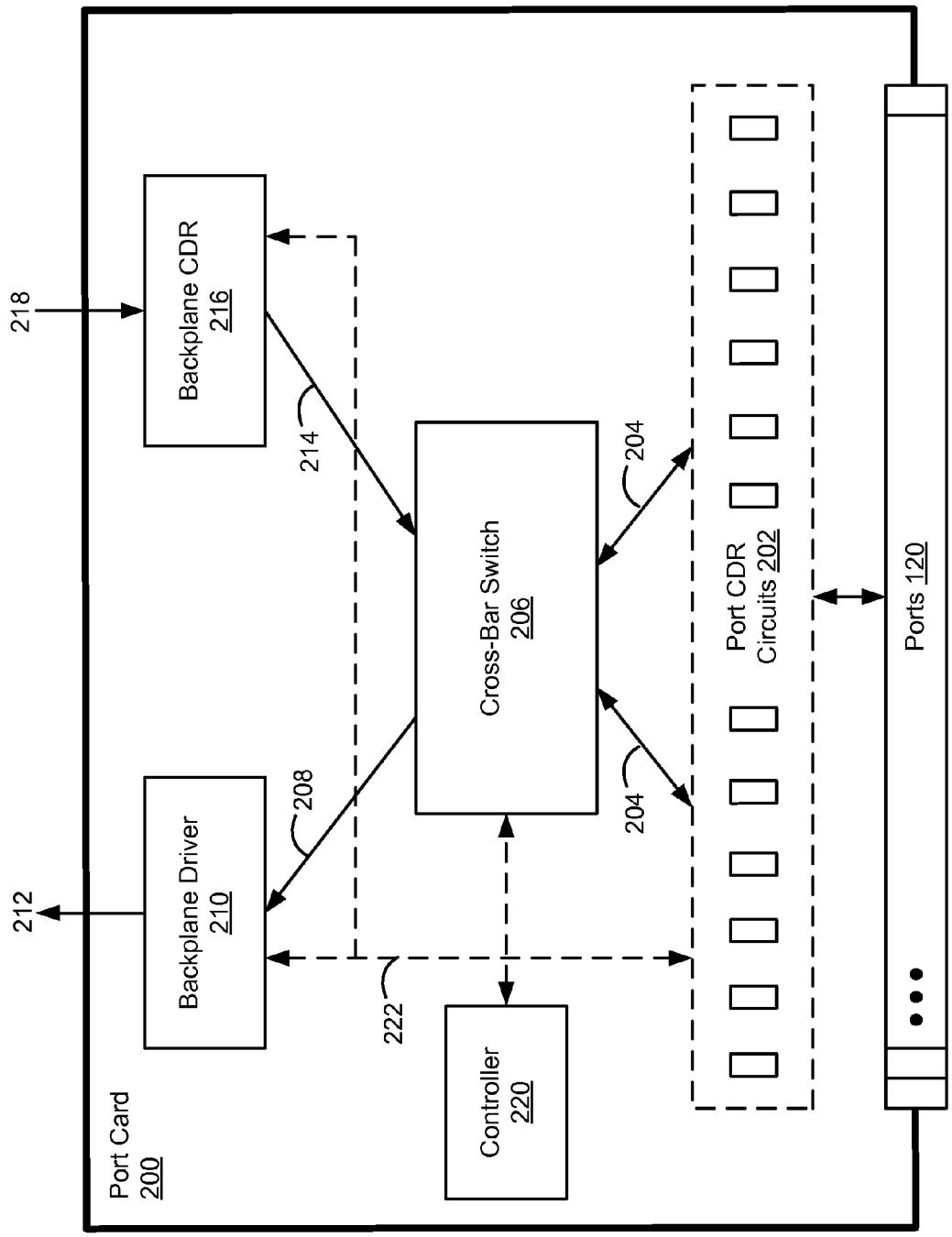
FIG. 2 is a block diagram illustrating a port card used in a physical layer switch in accordance with some embodiments.

FIG. 2 is a block diagram illustrating a port card 200 used in the physical layer switch 102, in accordance with some embodiments. The port card 200, also referred to as a Port Interface Module (PIM), is situated, for example, in a slot within the housing 124 (FIG. 1). The port card 200 includes a plurality of ports 120, such as the ports 120-$a$ through 120-$f$ (FIG. 1). In some embodiments, the ports 120 are small form-factor pluggable (SFP) or SFP+ ports (e.g., female ports to receive SFP or SFP+ transceiver modules). In some examples, the plurality of ports 120 includes a total of 48 ports.

The plurality of ports 120 are electrically coupled to a plurality of port clock-and-data recovery (CDR) circuits 202. Each of the port CDR circuits 202 is coupled to one or more of the ports 120. In some embodiments, each of the CDR circuits 202 includes multiple channels (e.g., four channels), with each channel coupled to, and thus corresponding to, a separate port 120. For example, there may be 48 ports 120 and 12 CDR circuits 202, with each CDR circuit 202 having four channels respectively coupled to four ports 120. Each CDR circuit 202 recovers (i.e., regenerates) signals from the corresponding one or more ports 120 and transmits the recovered signals to a cross-bar switch 206, and recovers signals received from the cross-bar switch 206 and transmits the recovered signals to specified ports 120 of the corresponding one or more ports 120. The CDR circuits 202 thus are bi-directional and act as transceivers that forward signals from the ports 120 to the cross-bar switch 206 and from the cross-bar switch 206 to the ports 120. For example, a suitable CDR circuit 202 is a Vitesse VSC8248 CDR chip with four channels. Another example of the CDR circuit 202 is a Broadcom BCM8152 10-Gbps transciever.

Signal lines 204 electrically couple the port CDR circuits 202 to the cross-bar switch 206. The cross-bar switch 206 is an electrical switch that creates dedicated circuit connections between respective ports 120 via respective port CDR circuits 202, respective signal lines 204, and the cross-bar switch 206 itself. In some implementations (e.g., in which the port card 200 has 48 ports), the cross-bar switch 206 has 144 inputs and 144 outputs and thus is a 144×144 cross-point switch. An example of a suitable cross-bar switch 206 is the Vitesse VSC3144-11 144×144 Asynchronous Crosspoint Switch. Another example of the cross-bar switch 206 is the Mindspeed M21161 144×144 Crosspoint Switch (e.g., the M21161-13XPS).

Figure 3:
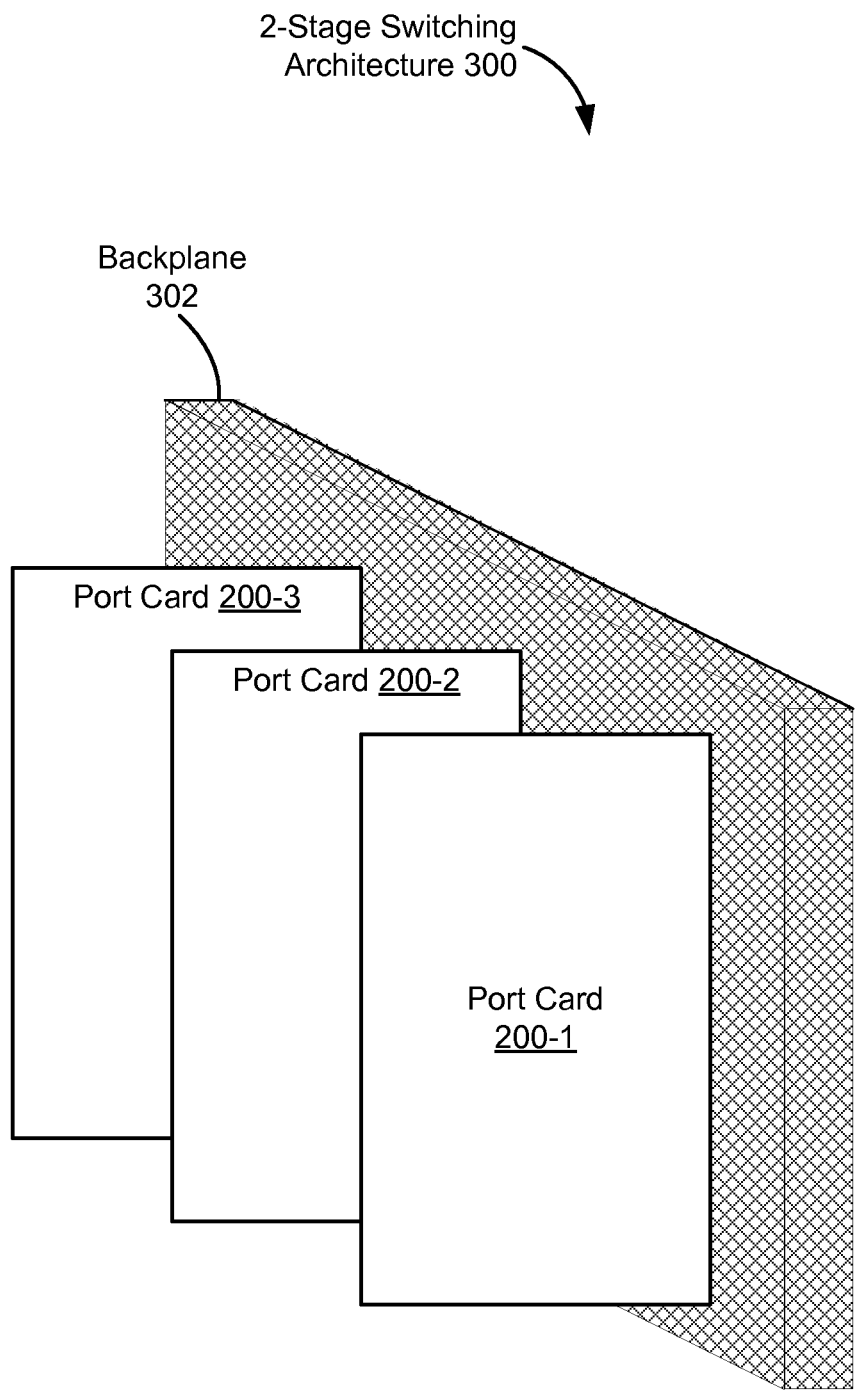
FIG. 3 illustrates a plurality of port cards connected to a backplane in a two-stage switching architecture in accordance with some embodiments.

In some embodiments, the physical layer switch 102 (FIG. 1) includes a single port card 200 mounted, for example, in a 1 U (i.e., one rack unit of height) chassis. Alternatively, the physical layer switch 102 includes multiple port cards 200 connected to a backplane. FIG. 3 illustrates three port cards 200-1, 200-2, and 200-3 connected to a backplane 302 in accordance with some embodiments. For example, the three port cards 200-1, 200-2, and 200-3 are mounted in a 3 U (i.e., three rack units of height) chassis that also contains the backplane 302. Each of the port cards 200-1, 200-2, and 200-3 is an example of a port card 200 (FIG. 2) and is connected to the backplane 302 by a connector (e.g., an orthogonal edge card connector, not shown).

In embodiments in which the physical layer switch 102 (FIG. 1) includes more than one port card 200, such as the three-port-card embodiment of FIG. 3, the cross-bar switches 206 on the port cards 200 are used to create dedicated circuit connections between respective ports 120 on respective port cards 200. For example, a dedicated circuit connection is created between a first port 120 on the first port card 200-1 and a second port 120 on the second port card 200-2. The cross-bar switch 206 of the first port card 200-1 receives a signal from the first port 120 via a corresponding CDR circuit 202 and signal line 204, and forwards the signal via a signal line 208 to a backplane driver 210, which drives the signal onto the backplane 302 via an output 212. When the signal arrives at the second port card 200-2, it is received at an input 218 of the backplane CDR circuitry 216 of the second port card 200-2. The backplane CDR circuitry 216 recovers the signal and transmits the recovered signal via a signal line 214 to the cross-bar switch 206 of the second port card 200-2. The backplane CDR circuitry 216 thus acts as a uni-directional transceiver. In some embodiments, the backplane CDR circuitry 216 is implemented using VSC8247 quad-port CDR chips from Vitesse, each of which includes four channels. In some other embodiments, the backplane CDR circuitry 216 is implemented using BCM8152 transceivers from Broadcom. The cross-bar switch 206 forwards the signal to the second port 120 via a corresponding signal line 204 and CDR circuit 202.

Signal lines on the backplane 302 couple the port cards 200-1, 200-2, and 200-3 to each other. For example, the backplane CDR circuitry 216 of each port card 200-1, 200-2, and 200-3 is coupled to, and receives signals from, the backplane drivers 210 of the other two port cards. In some embodiments, the backplane driver 210 is implemented as one or more cross-bar switches in a straight-through configuration. For example, the backplane driver 210 includes one or more Vitesse VSC3316 16×16 crosspoint switch chips, or the Mindspeed M21161 144×144 crosspoint switch chip. If the physical layer switch 102 (FIG. 1) includes only a single port card 200, the backplane driver 210 and backplane CDR circuitry 216 may be omitted.

The port card 200 also includes a controller 220 coupled to other components, including the port CDR circuits 202, cross-bar switch 206, backplane CDR circuitry 216, and/or backplane driver 210, via an internal control network 222. If the switch 102 includes multiple port cards 200, the internal control network 222 extends across each of the port cards 222, such that the controllers 220 on each port card 200 are electrically coupled and thus able to communicate. In some embodiments, a controller 220 on a first port card 200-1 acts as a master controller. The controller 220 communicates with built-in self-test (BIST) circuitry (described below with respect to FIGS. 5A-5B) in CDR chips on the port card 200, including BIST circuitry associated with the CDR circuits 202 and backplane CDR circuitry 216. For example, the controller 220 instructs the BIST circuitry to generate and transmit test patterns from CDR chips to other CDR chips, and receives data indicating whether the test patterns were received correctly. Based on this data, the controller 220 instructs respective components on the port card 200 to vary one or more adjustable parameters that affect signal transmission, in order to improve signal quality and thus calibrate the switch 120. These adjustable parameters are discussed further below with respect to FIGS. 5A, 5B, and 6. In some embodiments, the controller 220 is an MPC8358 processor from Freescale.

The switching architecture shown in FIG. 3 is referred to as a 2-stage switching architecture, or two-stage mesh, 300: at most, a signal traversing a dedicated circuit connection between respective ports 120 passes through two cards (e.g., the first port card 200-1 and the second port card 200-2). In some embodiments, a physical layer switch 102 has a 3-stage switching architecture in which a signal traversing a dedicated circuit connection may pass through three cards: a first port card 200-1, a middle-stage switching card, and a second port card 200-2. Physical layer switches with more than three switching stages also are possible.

The port cards 200 have been described in the context of a physical layer switch 102. In some embodiments, however, a layer 2, layer 3, layer 4, or multi-layer switch includes one or more port cards that are analogous to the port cards 200 but include a cross-bar switch that performs layer 2, layer 3, layer 4, or multi-layer switching.

Figure 4:
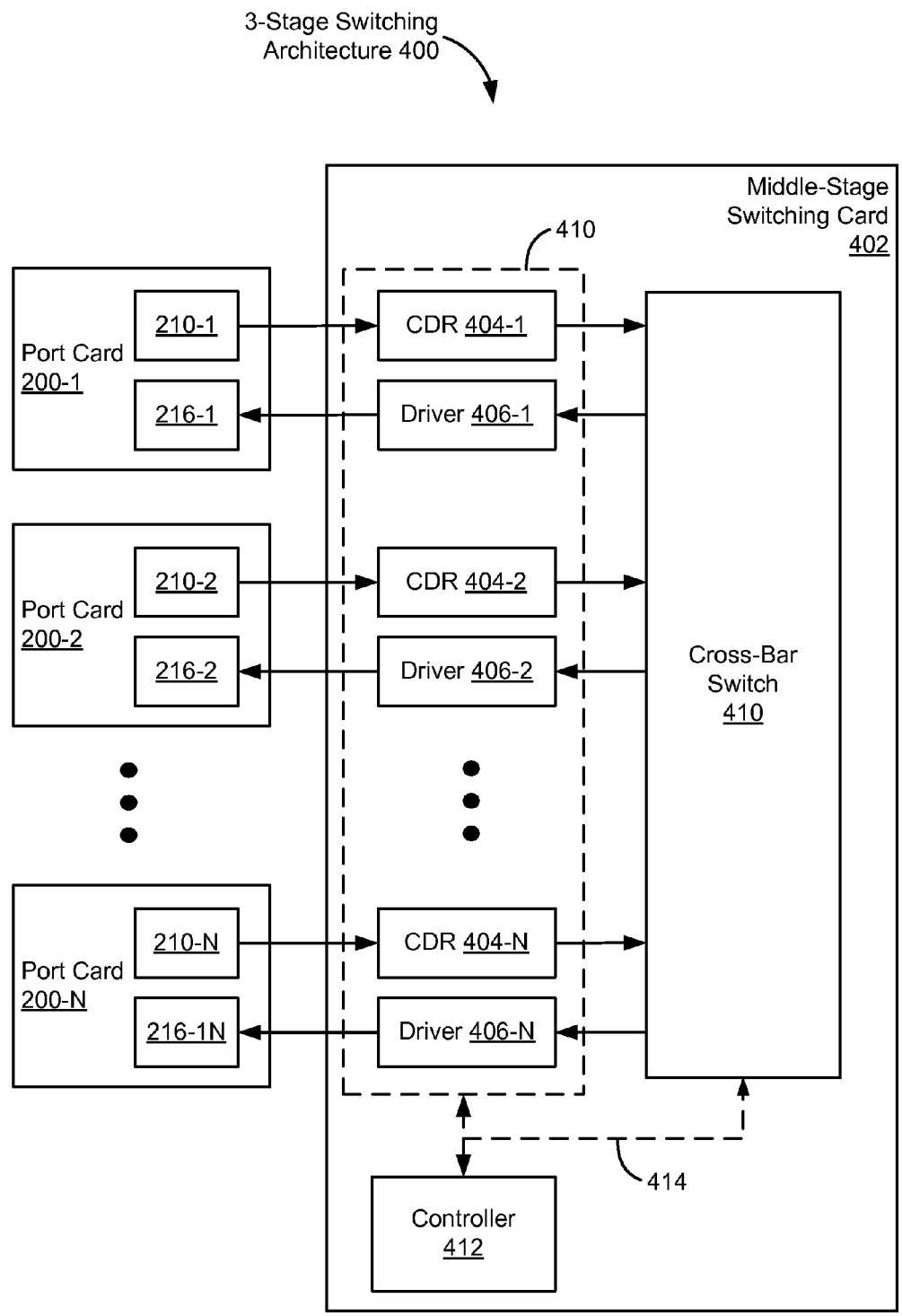
FIG. 4 is a block diagram illustrating a three-stage switching architecture in accordance with some embodiments.

FIG. 4 is a block diagram illustrating a three-stage switching architecture 400 in accordance with some embodiments. A plurality of port cards 200-1 through 200-N (where N is an integer greater than 1), each of which is an example of a port card 200 (FIG. 2), is electrically coupled to a middle-stage switching card 402. (Components of the port cards 200-1 through 200-N other than the drivers 210 and CDR circuitry 216 are omitted from FIG. 4 for visual simplicity). The middle-stage switching card 402 includes a plurality of CDR circuits 404-1 through 404-N (e.g., VSC8247 CDR chips or BCM8152 transceiver chips) to recover signals from corresponding port card drivers 210-1 through 210-N and to transmit the recovered signals to a cross-bar switch 410 (e.g., a 144×144 crosspoint switch, for example, the VSC3144 or M21161). The middle-stage switching card 402 also includes a plurality of driver circuits 406-1 through 406-N to forward signals from the cross-bar switch 410 to the CDR circuitry 216 of corresponding port cards 200. In some embodiments, the driver circuits 406-1 through 406-N are implemented as cross-bar switches (e.g., one or more Vitesse VSC3316 chips or the Mindspeed M21161 chip) in straight-through configurations. The cross-bar switch 410 thus switches signals between respective port cards 200 in accordance with the dedicated circuit connections established in the physical layer switch 102.

The middle-stage switching card 402 also includes a controller 412 that is electrically coupled to the CDR circuits 404-1 through 404-N, driver circuits 406-1 through 406-N, and cross-bar switch 410 via an internal control network 414. In some embodiments, the internal control network 414 is connected to the internal control network 222 (FIG. 2) to form a single internal control network across the switch 102. The controller 412 operates in conjunction with the controllers 220 on the port cards 200 to calibrate the switch 102 by performing BIST and varying one or more adjustable parameters of switch components (including the CDR circuits 404-1 through 404-N, driver circuits 406-1 through 406-N, and/or cross-bar switch 410) based on the results. In some embodiments, the controller 412, like the controller(s) 220, is an MPC8358 processor.

FIG. 4 is a schematic illustration of the 3-stage switching architecture 400. Physically, in some embodiments the port cards 200-1 through 200-N are coupled to the middle-stage switching card 402 through a mid-plane to which the port cards 200-1 through 200-N and switching card 402 are connected (e.g., using orthogonal connectors). Signal lines in the mid-plane electrically couple the backplane drivers 210-1 through 210-N (which in this context are mid-lane drivers instead of backplane drivers) to corresponding CDR circuits 404-1 through 404-N and the drivers 406-1 through 406-N to the corresponding CDR circuitry 216-1 through 216-N. In one example, the 3-stage switching architecture 400 is implemented in a 12 input/output slot 16U chassis with the middle-stage switching card 402 interconnecting the port cards 200-1 through 200-N in a 3-stage Clos arrangement.

In some embodiments, the dielectric material of the circuit boards for the port card(s) 200, middle-stage switching card 402, mid-plane in the 3-stage switching architecture 400, and/or backplane 302 in the 2-stage switching architecture 300 is Ventec, Nelco4000-13, or Megtron 6.

To enable calibrating, or in other words tuning, of a physical layer switch 102 (FIG. 1) with an architecture such as that shown in FIG. 2, 3, or 4 (or alternatively of another type of network switch, such as a layer 2, layer 3, layer 4, or multi-layer switch with an analogous architecture), the port CDR circuits 202 (FIG. 2), backplane CDR circuitry 216 (FIG. 2), and/or CDR circuits 404 (FIG. 4) on the middle-stage switching card 402 have associated BIST circuitry that, in conjunction with one or more controllers (e.g., embedded processors) 220 (FIG. 2) on one or more respective port cards 200, is used to tune one or more adjustable parameters of various components of the switch 102. This tuning reduces or minimizes the bit error rate (BER) for transmission of signals through the configurable dedicated communication paths in the switch 102. The BIST circuitry includes pattern generator circuits to generate test patterns to be transmitted between respective CDR circuits/circuitry and pattern checking circuits to verify test patterns received by respective CDR circuits/circuitry.

Figure 5A:
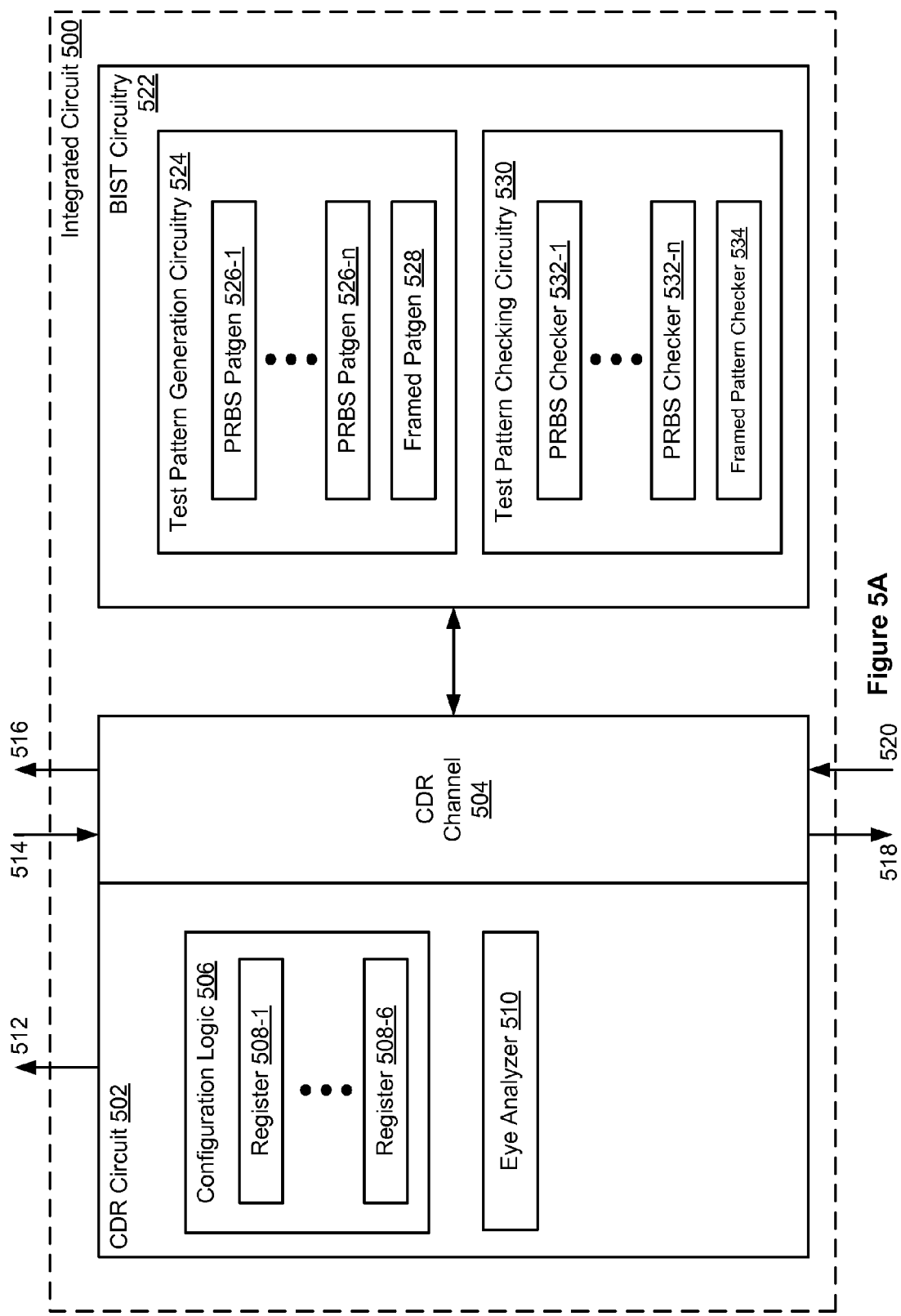
FIGS. 5A and 5B are block diagrams illustrating integrated circuits in which BIST circuitry is associated with a CDR circuit in accordance with some embodiments.

FIG. 5A is a block diagram illustrating BIST circuitry 522 associated with a CDR circuit 502 in accordance with some embodiments. In some embodiments, the CDR circuit 502 and BIST circuitry 522 are implemented in the same integrated circuit (IC) (i.e., chip) 500. The CDR circuit 502 includes a bi-directional CDR channel 504 with inputs 514 and 520 and outputs 516 and 518, each of which may be a differential input or output. Signals received at the input 514 are recovered (i.e., regenerated) and transmitted via the output 518, and signals received at the input 520 are recovered and transmitted via the output 516. The CDR circuit 502 is an example of a port CDR circuit 202 (FIG. 2) and the IC 500 is an example of a corresponding CDR chip, with the input 520 and output 518 connecting to a port 120 and the input 514 and output 516 corresponding to a signal line 204.

The BIST circuitry 522 includes test pattern generation circuitry 524, which includes one or more test pattern generation circuits to generate respective test patterns. For example, test pattern generation circuits 526-1 through 526-n, where n is an integer greater than or equal to 1, generate respective pseudo-random binary sequences (PRBSs). In some embodiments, each of the test pattern generation circuits 526-1 through 526-n generates a PRBS of a different length. In one example, n is three; the first test pattern generation circuit 526-1 generates a first PRBS ("PRBS15") with a length of 2^15 (i.e., two to the power of 15), the second test pattern generation circuit 526-2 generates a second PRBS ("PRBS23") with a length of 2^23, and the third test pattern generation circuit 526-3 generates a third PRBS ("PRBS31") with a length of 2^31. The test patterns are transmitted via the output 516 of the CDR channel 504. In some embodiments, the test pattern generation circuitry 524 also includes one or more test pattern generation circuits 528 that generate one or more respective framed test patterns. The test pattern generation circuits 526-1 through 526-n and 528 are activated in response to commands from a controller 220 (FIG. 2), as received at an interface 512 of the IC 500. The interface 512 connects the IC 500 to the control network 222 (FIG. 2).

The BIST circuitry 522 also includes test pattern checking circuitry 530 to verify test patterns received by the integrated circuit 500 (e.g., at the input 514) by determining whether the circuitry 530 recognizes the test patterns (a process referred to as "synchronization") and whether the received test patterns include any bit errors. The test pattern checking circuitry 530 includes circuitry to generate a specified test pattern and compare the generated test pattern to a received test pattern that is supposed to be the same pattern, to check for errors. For example, test pattern checking circuits 532-1 through 532-n verify respective PRBSs (e.g., of varying lengths). In some embodiments, the test patterns checked by the circuits 532-1 through 532-n correspond to the test patterns generated by the circuits 526-1 through 526-n. In some embodiments, the test pattern checking circuitry 530 also includes one or more test pattern checking circuits 534 to verify framed test patterns (e.g., corresponding to framed test patterns generated by the test pattern generation circuit(s) 528). The test pattern checking circuits 532-1 through 532-n and 534 are activated in response to commands from the controller 220 (FIG. 2), as received at the interface 512. The circuitry 530 transmits test pattern verification results to the controller 220 (FIG. 2) via the interface 512. In some embodiments, the test pattern checking circuits 532-1 through 532-n and 534 perform their verification for a specified period of time (e.g., one minute), which may be varied (e.g., in response to a command from the controller 220). For example, a respective one of the circuits 532-1 through 532-n and 534 counts the number of bit errors in a test pattern that occur during the specified period.

Before the test pattern checking circuitry 530 attempts to synchronize with a received test pattern and check for bit errors, the CDR channel 504 confirms that it has locked onto the test pattern. Failure of the CDR channel 504 to lock onto the test pattern indicates failed transmission of the test pattern, in which case the CDR circuit 502 notifies the controller 220 of the failure via the interface 512. The CDR circuit 502 also includes eye analyzer circuitry 510 to analyze the eye opening of the test pattern signal; the results of this analysis are also reported to the controller 220 via the interface 512

The CDR circuit 502 includes configuration logic 506 to specify values of adjustable parameters of the CDR channel 504 based on commands received from the controller 220 via the interface 512. (The controller 220, which may be on the same port card 200 as the IC 500 or a different port card 200, thus includes control circuitry to command the CDR circuit 502 to specify values of adjustable parameters; the values or corresponding codes are included, for example, in the commands.) In some embodiments, the values are specified by storing corresponding codes that specify the values in respective registers 508. For example, the configuration logic 506 includes six registers 508-1 through 508-6: the first register 508-1 stores a first code specifying a value for input equalization, the second register 508-2 stores a second code specifying an input DC offset value, the third register 508-3 stores a third code specifying a value for input gain, the fourth register 508-4 stores a fourth code specifying a value for output slew, the fifth register 508-5 stores a fifth code specifying a value for the output voltage differential, and the sixth register 508-6 stores a sixth code specifying a value for output pre-emphasis. In some embodiments, upon initialization of the switch 102, the codes in the registers 508 are set to default values that include minimum output slew, minimum output voltage differential, and no pre-emphasis, to minimize noise and cross-talk.

Figure 5B:
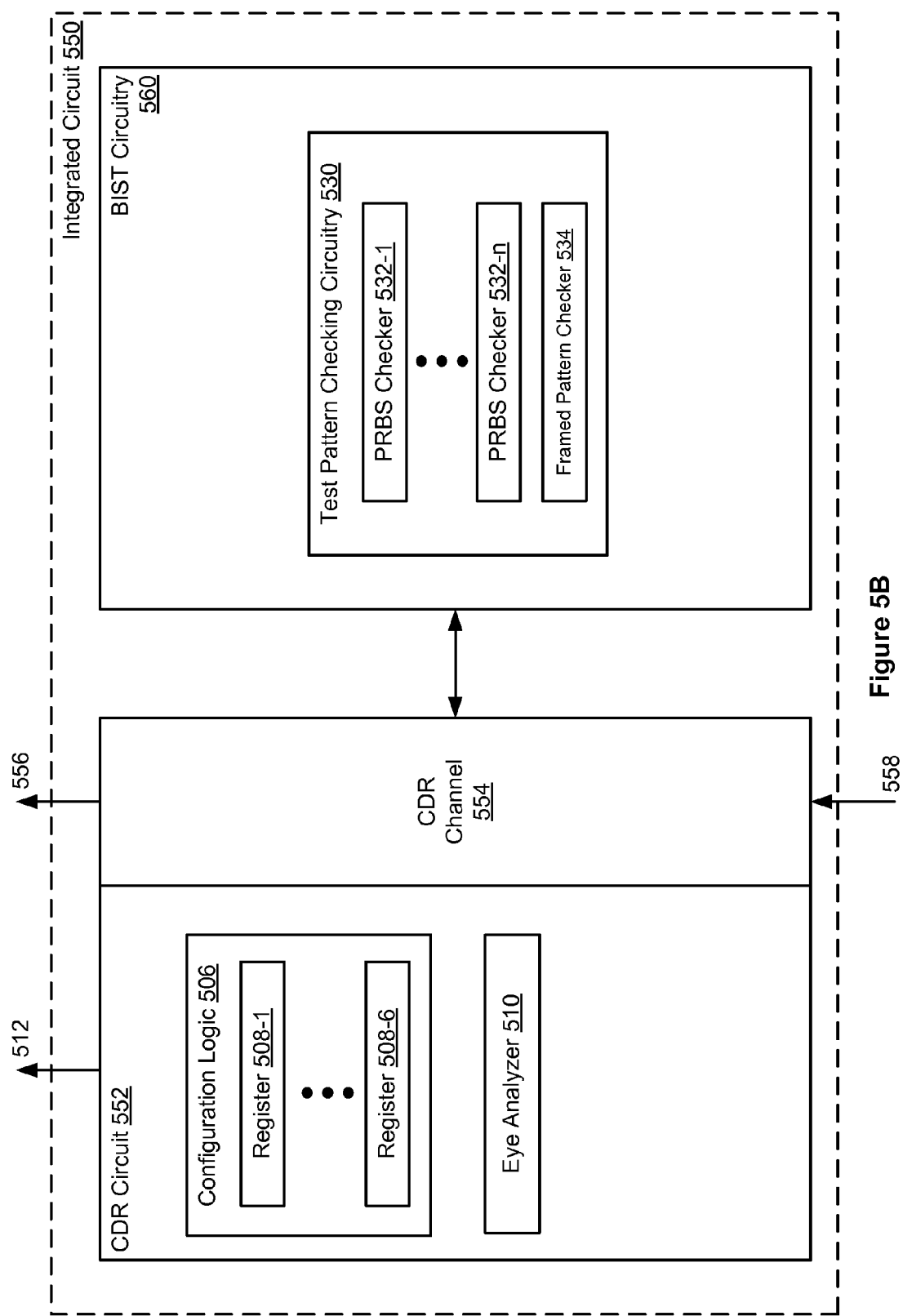

FIG. 5B is a block diagram illustrating BIST circuitry 560 associated with a CDR circuit 552 in accordance with some embodiments. In some embodiments, the BIST circuitry 560 and CDR circuit 552 are implemented in the same IC 550. The CDR circuit 552 corresponds to the CDR circuit 502 (FIG. 5A) except that the CDR channel 554 is uni-directional: it includes a single input 558 and a single output 556, each of which may be differential. The CDR circuit 552 is an example of a CDR circuit in the backplane CDR circuitry 216 (FIG. 2) or of a CDR circuit 404 (FIG. 4). The BIST circuitry 560 includes the test pattern checking circuitry 530 of the BIST circuitry 522 (FIG. 5A), but does not include the test pattern generation circuitry 524. Instead of generating its own test patterns, the IC 550 receives test patterns at the input 558 and transmits the test patterns via the output 556, thereby forwarding on the test patterns. Test patterns received at the input 558 were originally generated, for example, by test pattern generation circuitry 524 in an IC 500 (FIG. 5A), such as a port CDR circuit 202 (FIG. 2).

The CDR circuits 502 (FIG. 5A) and 552 (FIG. 5B) in the ICs 500 and 550 are shown with a single CDR channel 504 or 554. In some embodiments, however, a CDR chip includes a plurality of CDR channels (e.g., four CDR channels). In such embodiments, the CDR chip may include separate configuration logic 506, eye analyzer circuitry 510, and/or BIST circuitry 522 for each channel.

Figure 6:
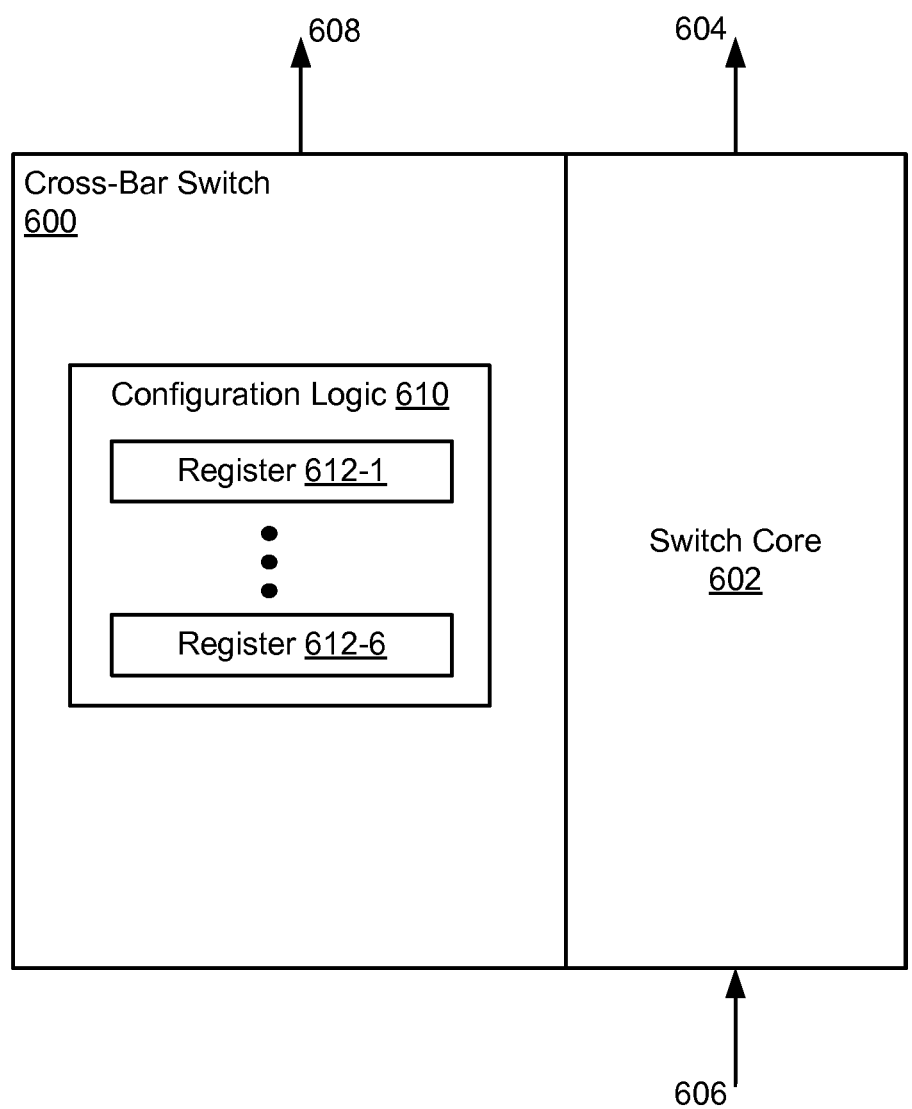
FIG. 6 is a block diagram illustrating a cross-bar switch in accordance with some embodiments.

FIG. 6 is a block diagram illustrating a cross-bar switch 600 in accordance with some embodiments. The cross-bar switch 600 is an example of the cross-bar switch 206 (FIG. 2) and/or 410 (FIG. 4). In some embodiments, the cross-bar switch 600 is also an example of the backplane driver 210 (FIG. 2) and/or the drivers 406-1 through 406-N (FIG. 4) when configured in a straight-through configuration. An electrical switch core 602 in the cross-bar switch 600 provides the switching functionality by establishing dedicated connections between respective inputs 606 and outputs 604. The cross-bar switch 600 also includes configuration logic 610 to specify values of adjustable parameters of the switch core 602 based on commands received from the controller 220 via an interface 608. The interface 608 connects the cross-bar switch 600 to the control network 222 (FIG. 2), thereby electrically coupling the cross-bar switch 600 to the controller 220. The configuration logic 610 operates in a similar manner as the configuration logic 506 (FIGS. 5A-5B). For example, the configuration logic 610 includes registers 612-1 through 616-6 that store codes specifying values of adjustable parameters (e.g., the adjustable parameters corresponding to the registers 508-1 through 508-6, FIGS. 5A-5B). The cross-bar switch 600 thus may have the same adjustable parameters as the CDR circuit 502 (FIG. 5A).

Calibration of a network switch (e.g., a physical layer switch 102) is performed by successively tuning components of successive data path segments, where a data path segment extends from a first CDR chip to a second CDR chip. For example, to begin the calibration process, data path segments between port CDR circuits 202 on each port card 200 and other port CDR circuits 202 on the same port card 200 are calibrated. Test patterns are generated by test pattern generation circuits 526 or 528 (FIG. 5A) in each port CDR circuit 202 and transmitted to the cross-bar switch 206, which forwards them to other port CDR circuits 202 (or to another channel in the same CDR circuit 202). In some embodiments, each channel 504 of each port CDR circuit 202 transmits a test pattern in parallel to the cross-bar switch 206, which forwards each test pattern to a different channel 504 in the port CDR circuits 202 of the same port card 200. (Multiple parallel data path segments are thereby tested simultaneously.) Test pattern checking circuits 532 or 534 in the port CDR circuits 202 verify the received test patterns by checking whether the received test patterns satisfy one or more predefined criteria. The one or more predefined criteria include, for example, whether the corresponding CDR channel 504 can lock onto a received test pattern, whether the checking circuit 532 or 534 can synchronize with the received test pattern, whether the received test pattern has fewer than a specified number of bit errors during a specified period of time (e.g., 1 minute) or has a bit error rate less than a specified value (e.g., less than $10^{-3}$) during the specified period of time, and/or whether the received test pattern has a data signal eye with a specified width and/or height. If a particular received test pattern does not satisfy the one or more predefined criteria, transmission of the test pattern is considered to have failed and the failure is reported to a controller 220, which instructs a component in the data path segment over which the failing test pattern was transmitted to change a value of an adjustable parameter. If multiple test patterns failed, changes are made in parallel to values of adjustable parameters of components of the failing data path segments. Transmission of the test patterns is then repeated, until all received test patterns are verified to satisfy the one or more predefined criteria, in which case the corresponding data path segments are considered to be passing. In some embodiments, this process is then repeated for the same parallel data path segments using increasingly difficult (e.g., increasingly long) PRBSs. For example, this process is performed repeatedly for a given set of parallel data path segments first using PRBS15, then PRBS23, then PRBS31.

Figure 7A:
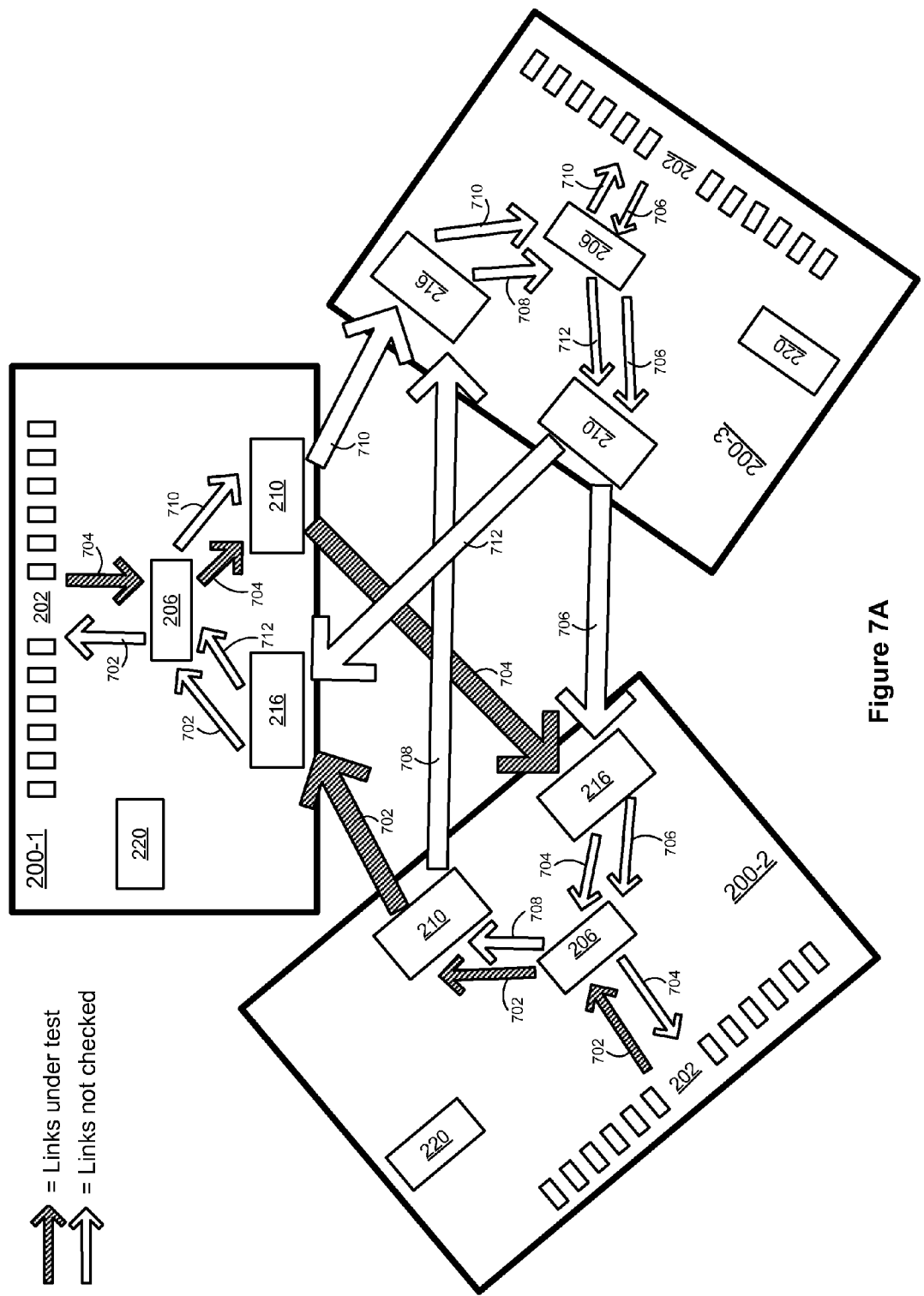
FIGS. 7A and 7B illustrate calibration of data path segments in a two-stage switching architecture in accordance with some embodiments.

In a switch with a two-stage switching architecture 300 (FIG. 3), once data path segments between respective port CDR circuits 202 of the same port card 200 have been tuned for each of the port cards 200, parallel data path segments between port CDR circuits 202 of a first port card 200-1 and backplane CDR circuitry 216 of a second port card 200-2 are calibrated, as illustrated in FIG. 7A in accordance with some embodiments (the data path segments being calibrated are shown as "links under test"; each segment includes a sequence of links between successive components). Test patterns 704 are generated by test pattern generation circuits 526 or 528 (FIG. 5A) in each port CDR circuit 202 of the first port card 200-1 and transmitted via the cross-bar switch 206 and backplane driver 210 to the backplane CDR circuitry 216 of the second port card 200-2. Test pattern checking circuits 532 or 534 (FIG. 5B) in the backplane CDR circuitry 216 verify the received test patterns 704 by checking whether the received test patterns 704 satisfy the one or more predefined criteria. Components in failing data path segments are tuned by changing values of adjustable parameters. Simultaneously, parallel data path segments between port CDR circuits 202 of the second port card 200-2 and backplane CDR circuitry 216 of the first port card 200-1 are calibrated in a similar manner, using test patterns 702 transmitted by the port CDR circuits 202 of the second port card 200-2. This process is repeated until all of the data path segments under test are passing.

While calibrating the data path segments under test in FIG. 7A, test patterns are simultaneously transmitted over all other data path segments to maximize noise and cross-talk. For example, the cross-bar switches 206 of each port card 200 use their broadcast capability to transmit test patterns 708, 710, and 712 (copied respectively from test patterns 702, 704, and 706) via backplane drivers 210 to the backplane circuits 216 of other port cards 200. The backplane CDR circuits 216 of each port card 200 forward test patterns 702, 704, 706, 708, 710, and 712 to respective cross-bar switches 206, as shown in FIG. 7A, and the cross-bar switches 206 forward the test patterns 702, 704, and 710 to respective port CDR circuits 202. Transmitting test patterns over all data path segments while calibrating the data path segments under test ensures that the calibration is performed under worst-case conditions for noise and cross-talk, thus helping to ensure that the calibrated data path segments will function properly in actual use.

The calibration process shown in FIG. 7A is also performed to calibrate corresponding data path segments between port CDR circuits 202 and backplane CDR circuits 216 of data paths between the port cards 200-1 and 200-3, and between the port cards 200-2 and 200-3.

Once the data path segments under test in FIG. 7A have been calibrated, data path segments between backplane CDR circuitry 216 on the second port card 200-2 and port CDR circuits 202 on the second port card 200-2 are calibrated. Test patterns 704 received at the backplane CDR circuitry 216 are forwarded to the port CDR circuits 202 via the cross-bar switch 206. Test pattern checking circuits 532 or 534 (FIG. 5A) in the port CDR circuits 202 verify the received test patterns 704 by checking whether the received test patterns 704 satisfy the one or more predefined criteria (e.g., whether the port CDR circuits 202 locked to the test patterns, whether the port CDR circuits 202 synchronized with the test patterns, whether the data eyes of the test patterns had a specified width and/or height, and/or whether the number of bit error or a corresponding BER was less than a specified value). Values of adjustable parameters of components in failing data path segments are changed, and the testing is repeated until all data path segments are passing. Simultaneously, data path segments between backplane CDR circuitry 216 on the first port card 200-1 and port CDR circuits 202 on the first port card 200-1 are calibrated in a similar manner using test patterns 702.

Figure 7B:
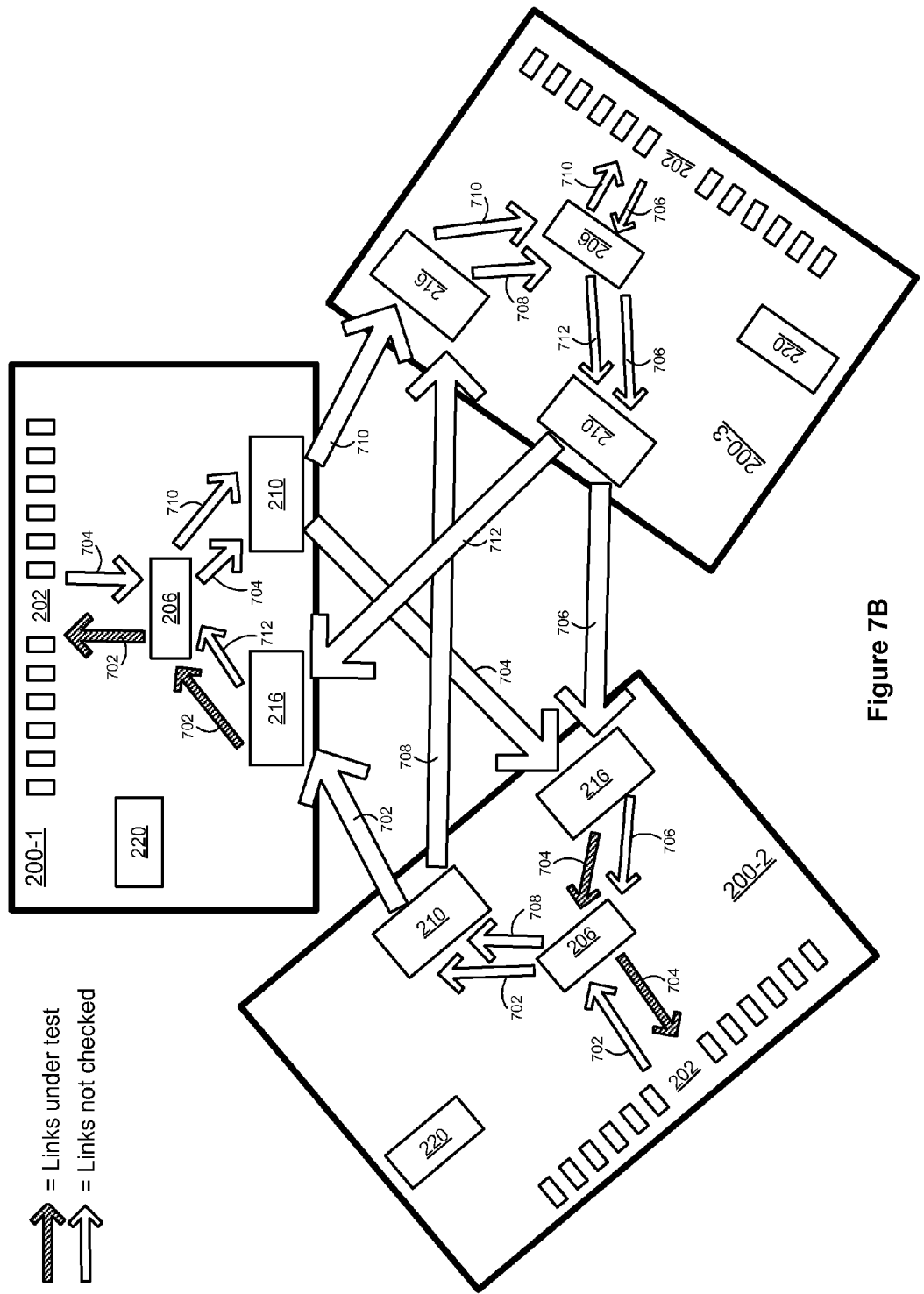

FIGS. 7A and 7B illustrate successively tuned or calibrated data path segments in a two-stage switching architecture 300. In a three-stage switching architecture 400, data path segments are calibrated in the following order: (1) data path segments between respective port CDR circuits 202 on the same port card 200; (2) data path segments between port CDR circuits 202 on port cards 200 and CDR circuits 404 on the middle-stage switching card 402, the segments including the corresponding cross-bar switch 206 and driver 210; (3) data path segments between CDR circuits 404 on the middle-stage switching card 402 and CDR circuitry 216 on respective port cards 200, the segments including the cross-bar switch 410 and corresponding driver 406; and (4) data path segments between CDR circuitry 216 on respective port cards 200 and port CDR circuits 202 on the same port cards 200, the segments including respective cross-bar switches 206.

A given data path segment includes multiple components with adjustable parameters (e.g., input equalization, input DC offset, input gain, output slew, output voltage differential, and/or output pre-emphasis) that may be tuned. In some embodiments, components are tuned successively in the order in which they are positioned in the data path segment, until the segment is passing. For example, in a data path segment that extends from a first port CDR circuit 202, through a cross-bar switch 206, to a second port CDR circuit 202, the first port CDR circuit 202 is tuned first. If the data path segment is not passing after tuning the first port CDR circuit 202, the cross-bar switch 206 is then tuned. If the data path segment is not passing after tuning the cross-bar switch 206, the second port CDR circuit 202 is then tuned. In another example, components of a data path segment between a port CDR circuit 202 on a first port card 200-1 and backplane CDR circuitry 216 on a second port card 200-2 are tuned in the following order: (1) the port CDR circuit 202 on the first port card 200-1, (2) the cross-bar switch 206 on the first port card 200-1, (3) the backplane driver 210 on the first port card 200-1, and (4) the backplane CDR circuitry 216 on the second port card 200-2. In still another example, components of a data path segment between backplane CDR circuitry 216 on a port card 200 and a port CDR circuit 202 on the same port card 200 are tuned in the following order: (1) the backplane CDR circuitry 216, (2) the cross-bar switch 206, and (3) the port CDR circuit 202. Similarly, components are tuned successively in the order in which they are positioned in respective data path segments in a three-stage switching architecture 400.

Components include multiple adjustable parameters that may be tuned by changing the specified values of the parameters. In some embodiments, the parameters for a given component are tuned in the following order: (1) input equalization, (2) input DC offset, (3) input gain, (4) output slew, (5) output voltage differential, and (6) output pre-emphasis. In some embodiments, only a subset of the possible values of the adjustable parameters is used, to reduce the calibration time.

Figure 8:
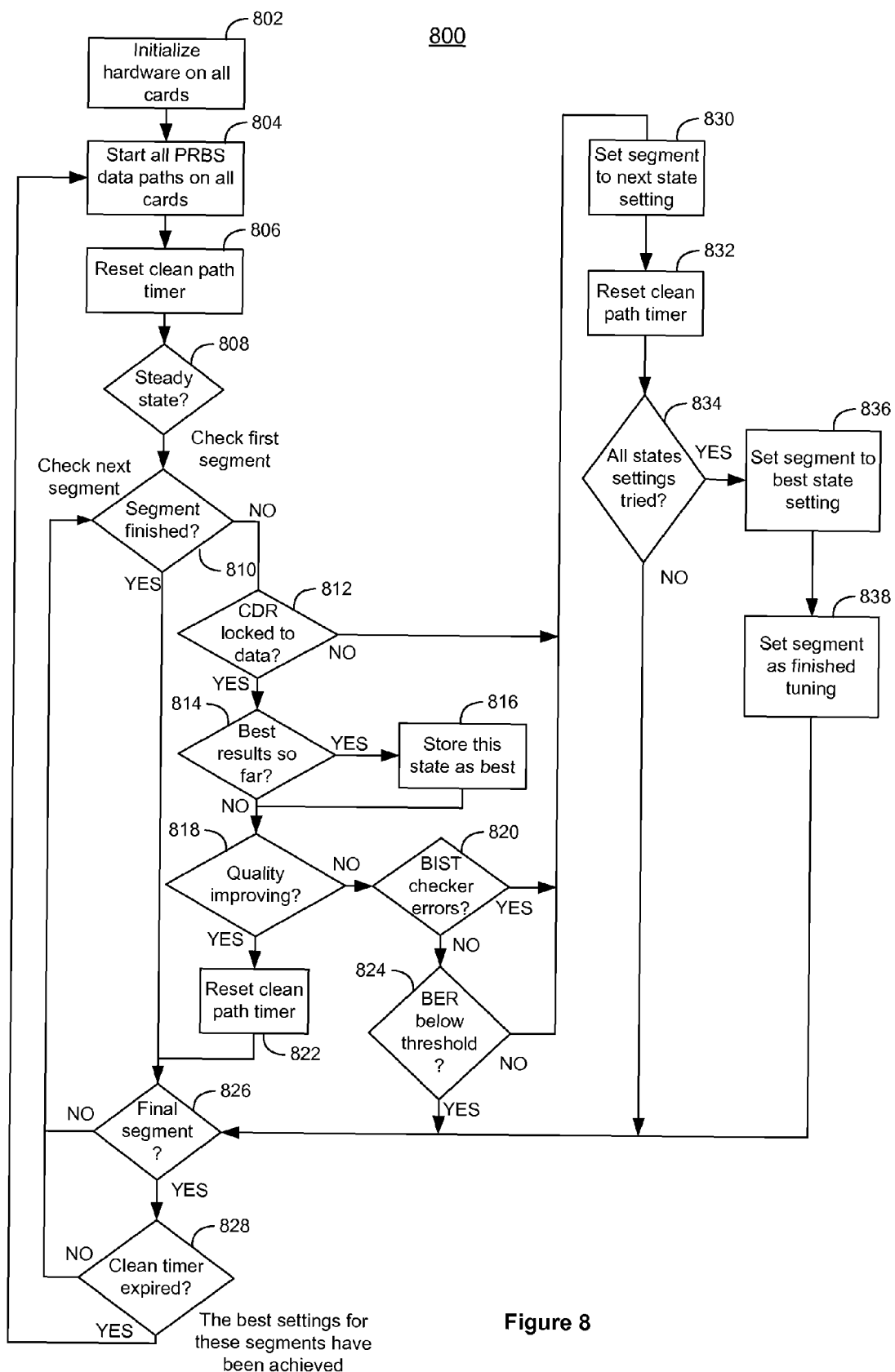
FIG. 8 is a flow diagram illustrating an automated tuning process in accordance with some embodiments.

FIG. 8 is a flow diagram illustrating an automated tuning process 800 for tuning data path segments in a network switch (e.g., a physical layer switch 102) in accordance with some embodiments. To begin the method 800, the hardware (e.g., components) on all cards (e.g., port cards 200 and, in some embodiments, one or more middle stage switching cards 402) is initialized (802). PRBS test patterns (or alternatively, framed test patterns) are transmitted across all data paths on every card in the switch 102 (804). A "clean path timer" is reset (806). The clean path timer will be used to measure the amount of time that the link combinations in a data path segment have passed the predefined criteria that indicate successful tuning.

A determination is made as to whether transmission of the test patterns has reached steady-state (808). This determination is made, for example, by determining that the eye quality for the data path segments under test (e.g., as measured by eye analyzer circuitry 510 in the component at the end of the data path segment under test) has reached steady state.

For the data path segment under test, a determination is made as to whether the CDR circuitry at the end of the data path segment has locked to the test patterns (812). If the CDR circuitry has locked (812—Yes), a determination is made as to whether the test results (e.g., as determined by the number of bit errors and/or eye quality for the segment) is the best so far (814). If the test results are the best so far (814—Yes), the state setting for the components in the data path segment is stored as the best state setting (816). The term "state setting" in this context refers to the collective values of the adjustable parameters of components in the data path segment.

A determination is made (818) as to whether the quality of the segment is improving with respect to previous iterations of the process, and thus as to whether previous changes to adjustable parameters have improved transmission quality (e.g., is the number of bit errors decreasing and/or is the eye quality improving). If the quality is improving (818—Yes), the clean path timer is reset (822). If the quality is not improving (818—No), a determination is made (820) as to whether the BIST checker (e.g., the test pattern checking circuitry 530, FIGS. 5A-5B) of the last component of the data path segment has detected bit errors and, if not (820—No), whether the BER is below a specified threshold (e.g., $10^{-3}$) (824). If the BER is below the specified threshold (824—Yes), or alternatively after resetting the clean path timer (822), the process 800 proceeds to the operation 826.

If the CDR circuitry does not lock to the test pattern data (812—No), the BIST checker detects errors (820—Yes), or the BER is not below the specified threshold (824—No), the state setting for the data path segment is changed (830): one or more adjustable parameters of one or more components of the data path segment is tuned. The clean path timer is reset (832). If all state settings have not been tried (834—No), the process 800 proceeds to the operation 826. If, however, all state settings have been tried (834—Yes), then the data path segment is set to the best state setting (836) and is specified as having finished tuning (838).

If the final data path segment has not been checked (826—No), the process 800 returns to the operation 812 for a next data path segment. Likewise, if the final data path segment has been checked (826—Yes) but the clean path timer has not expired (828—No), the process 800 returns to the operation 812 for a next data path segment. If, however, the final data path segment has been checked (826—Yes) and the clean path timer has expired (828—Yes), the process 800 is repeated with a longer PRBS, if available. The process 800 is also repeated for different data path segments formed from different combinations of links between switch components. For example, if a cross-bar switch 206 in a port card 200 has 48 port links to port CDR circuits 202 and 96 back links to other port cards 200, the process 800 is repeated 96 times, such that all 48 front links are tested to all 96 back links, with a total of 4308 paths being tested. Thus in some embodiments the process 800 is repeated a number of times corresponding to the number of back links of the cross-bar switch 206.

Figure 9A:
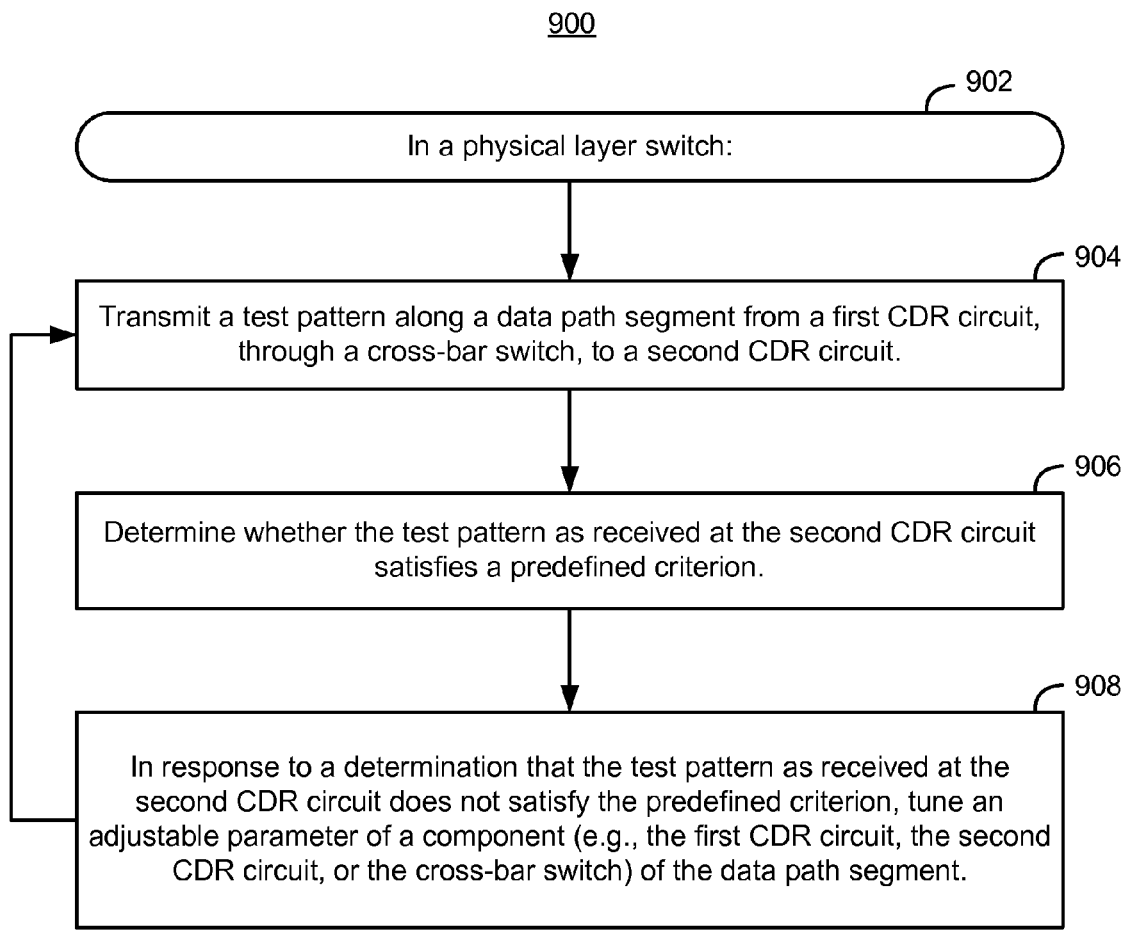
FIGS. 9A-9D are flow diagrams illustrating methods of calibrating physical layer switches in accordance with some embodiments.

FIG. 9A is a flow diagram illustrating a method 900 of calibrating a network switch in accordance with some embodiments. The method 900 is performed (902) in a physical layer switch 102 (or alternatively in a layer 2, layer 3, layer 4, or multi-layer switch), which may have, for example, a single port card 200 (FIG. 2), a two-stage switching architecture 300 (FIG. 3), or a three-stage switching architecture 400 (FIG. 3).

In the method 900, a test pattern (e.g., a PRBS generated by a test pattern generation circuit 526 or a framed test pattern generated by a test pattern generation circuit 528, FIG. 5A) is transmitted (904) along a data path segment from a first CDR circuit, through a cross-bar switch, to a second CDR circuit. Examples of such data path segments include segments from a first port CDR circuit 202 to a second port CDR circuit 202 on the same port card 200, from a port CDR circuit 202 on a first port card 200-1 to a backplane CDR circuit 216 on a second port card 200-2, from a backplane CDR circuit 216 to a port CDR circuit 202 on the same port card 200, from a port CDR circuit 202 on a port card 200 to a CDR circuit 404 on a middle-stage switching card 402, and from a CDR circuit 404 on a middle-stage switching card 402 to CDR circuitry 216 on a port card 200.

A determination is made (906) as to whether the test pattern as received at the second CDR circuit satisfies a predefined criterion. The determination is made, for example, using test pattern checking circuitry 530 and/or eye analyzer circuitry 510 (FIGS. 5A-5B) associated with the second CDR circuit.

In response to a determination that the test pattern as received at the second CDR circuit does not satisfy the predefined criterion, an adjustable parameter of a component (e.g., the first CDR circuit, the second CDR circuit, or the cross-bar switch) of the data path segment is tuned (908).

The operations 904, 906, and 908 are repeated (e.g., in accordance with the process 800, FIG. 8) until a determination is made in operation 906 that the test pattern as received at the second CDR circuit satisfies the predefined criterion.

Figure 9B:
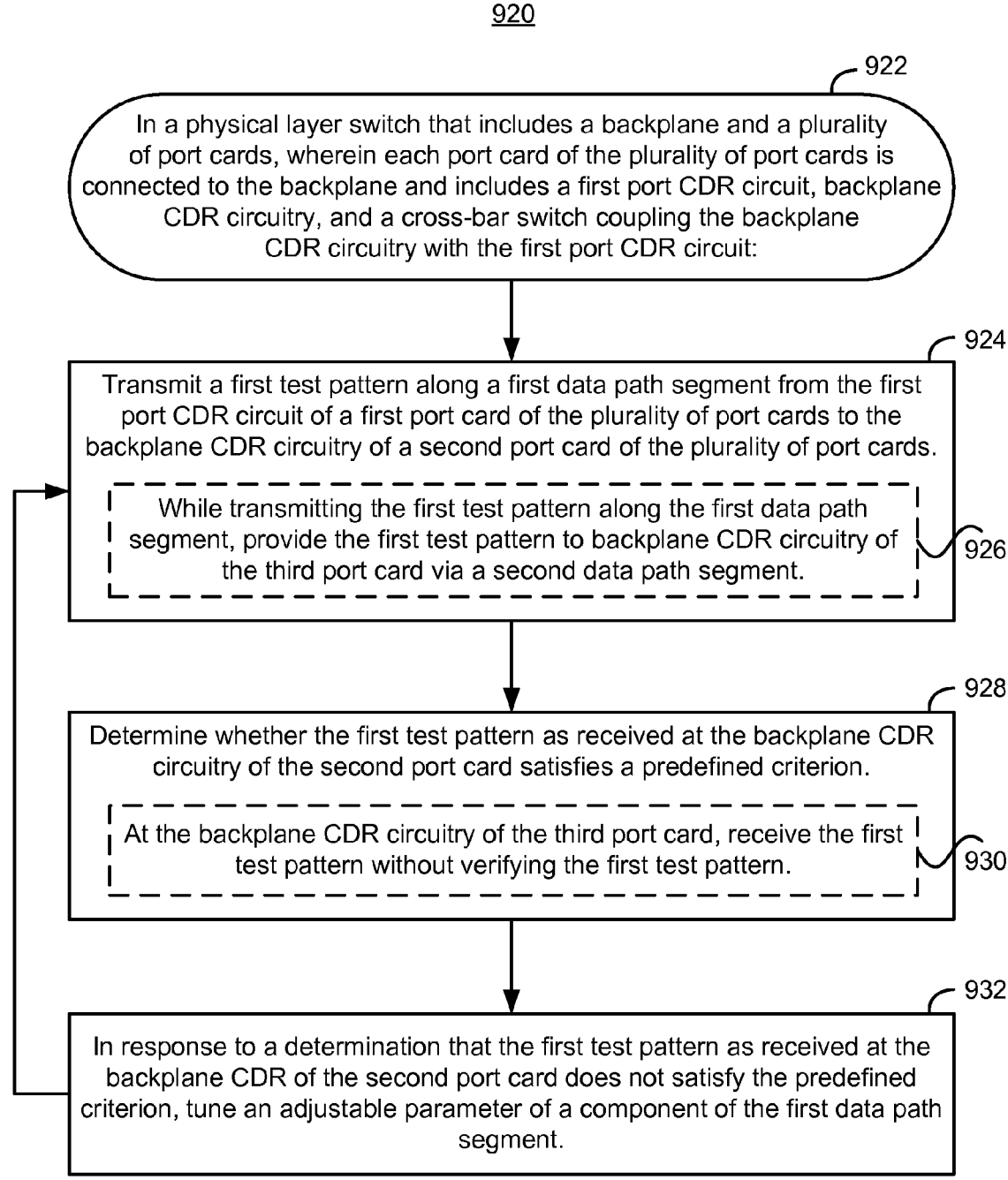

FIG. 9B is a flow diagram illustrating a method 920 of calibrating a network switch in accordance with some embodiments. The method 920 is performed (922) in a physical layer switch 102 (or alternatively in a layer 2, layer 3, layer 4, or multi-layer switch) that includes a backplane 302 (FIG. 3) and a plurality of port cards 200 (e.g., 200-1 through 200-3, FIG. 3). Each port card 200 of the plurality of port cards 200 is connected to the backplane 302 and includes a first port CDR circuit 202, backplane CDR circuitry 216, and a cross-bar switch 206 coupling the backplane CDR circuitry 216 with the first port CDR circuit 202, as shown for example in FIG. 2.

In the method 920, a first test pattern (e.g., a PRBS generated by a test pattern generation circuit 526 or a framed test pattern generated by a test pattern generation circuit 528, FIG. 5A) is transmitted (924) along a first data path segment from the first port CDR circuit 202 of a first port card 200-1 of the plurality of port cards to the backplane CDR circuitry 216 of a second port card 200-2 of the plurality of port cards. In some embodiments, while transmitting the first test pattern along the first data path segment, the first test pattern is also provided (926) to backplane CDR circuitry 216 of the third port card 200-3 via a second data path segment. An example of these transmissions is shown in FIG. 7A.

A determination is made (928) as to whether the first test pattern as received at the backplane CDR circuitry 216 of the second port card 200-2 satisfies a predefined criterion. The determination is made, for example, using test pattern checking circuitry 530 and/or eye analyzer circuitry 510 (FIG. 5B) associated with the backplane CDR circuitry 216 of the second port card 200-2.

In some embodiments, the first test pattern is also received (930) at the backplane CDR circuitry 216 of the third port card 200-3 without being verified (e.g., as shown in FIG. 7A).

In response to a determination that the first test pattern as received at the backplane CDR of the second port card does not satisfy the predefined criterion, an adjustable parameter of a component of the first data path segment is tuned (932).

In some embodiments, the transmitting and determining of the operations 924 and 928 are performed repeatedly (e.g., in accordance with the process 800, FIG. 8), and the tuning of the operation 932 is performed repeatedly for the same adjustable parameter of a particular component of the first data path segment, for multiple adjustable parameters of the particular component of the first data path segment, and/or for one or more adjustable parameters of successive components of the first data path segment, until a determination is made in the operation 928 that the first test pattern as received at the backplane CDR circuitry 216 of the second port card 200-2 satisfies the predefined criterion.

In some embodiments, while transmitting (924) the first test pattern along the first data path segment, a second test pattern (e.g., generated using test pattern generation circuitry 524 (FIG. 5A) associated with the first port CDR circuit 202 of the second port card 200-2) is transmitted along a third data path segment from the first port CDR circuit 202 of the second port card 200-2 to the backplane CDR circuitry 216 of the first port card 200-1. A determination is made (e.g., using test pattern checking circuitry 530 and/or eye analyzer circuitry 510 (FIG. 5B) associated with the backplane CDR circuitry 216 of the first port card 200-1) as to whether the second test pattern as received at the backplane CDR circuitry 216 of the first port card 200-1 satisfies the predefined criterion, in the same manner as in the operation 928. In response to a determination that the second test pattern as received at the backplane CDR circuitry 216 of the first port card 200-1 does not satisfy the predefined criterion, an adjustable parameter of a component of the third data path segment is tuned, in the same manner as in the operation 932. The transmitting, determining, and tuning operations for the third data path segment may be repeated in the same manner as for the first data path segment in the operations 924, 928, and 932. In some embodiments, the repetition of these operations for the first and third data path segments occurs in parallel.

In some embodiments, while transmitting the second test pattern along the third data path segment, the second test pattern is also provided to the backplane CDR circuitry 216 of a third port card 200-3 via a fourth data path segment. The second test pattern is received at the backplane CDR circuitry 216 of the third port card 200-3 without determining whether the second test pattern satisfies the predefined criterion, and thus without verifying the second test pattern, as shown for example in FIG. 7A.

In some embodiments, the backplane CDR circuitry 216 of each respective port card 200 (e.g., each of the first, second and third port cards 200-1 through 200-3) forwards a respective test pattern received at the backplane CDR circuitry 216 of the port card 200 to a port CDR circuit 202 of the port card 200. In some embodiments, while transmitting the first test pattern along the first data path segment and the second test pattern along the third data path segment, test patterns are transmitted along all other data path segments in the switch 102 (e.g., as shown in FIG. 7A).

Figure 9C:
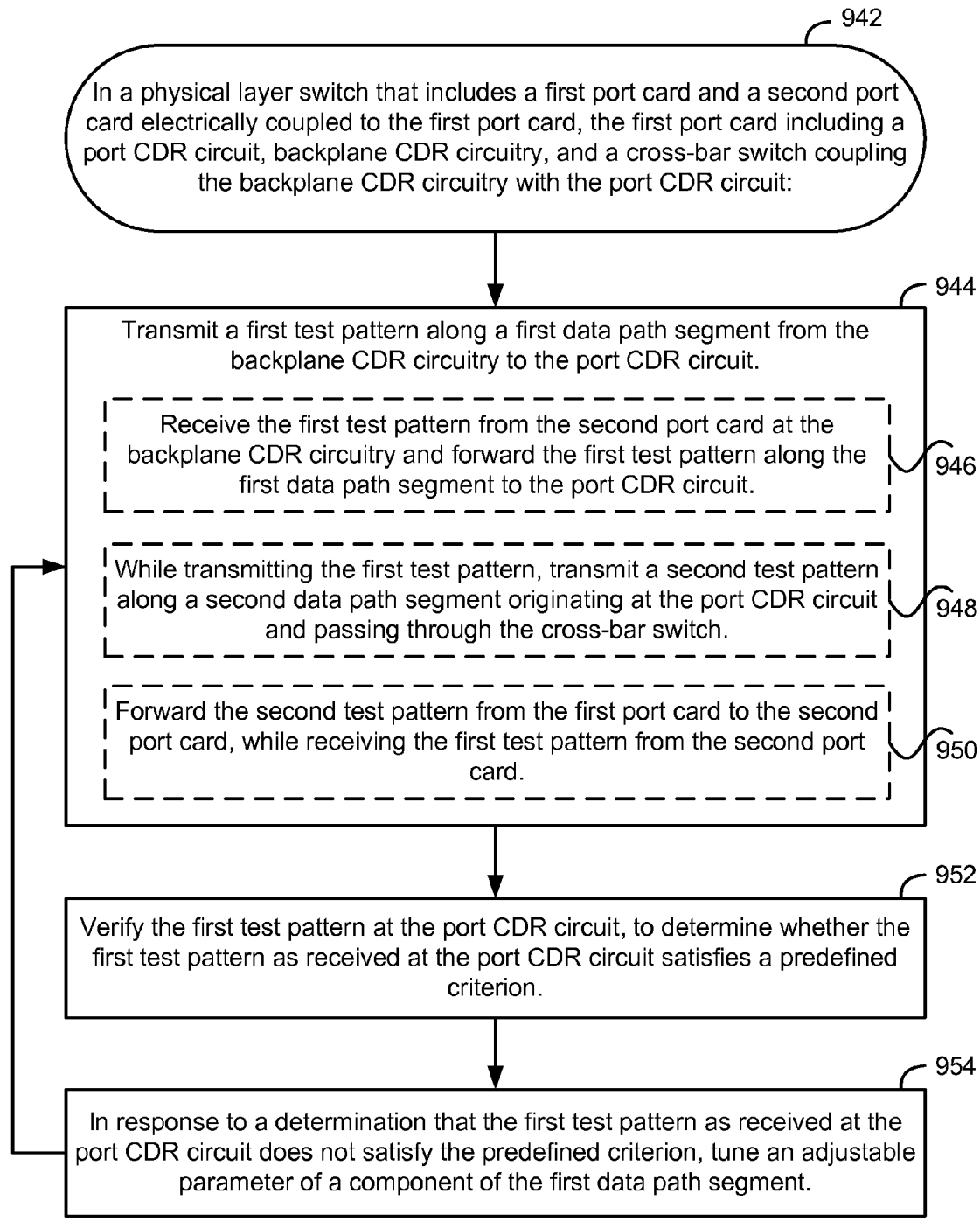

FIG. 9C is a flow diagram illustrating a method 940 of calibrating a network switch in accordance with some embodiments. The method 940 is performed (942) in a physical layer switch 102 (or alternatively in a layer 2, layer 3, layer 4, or multi-layer switch) that includes a first port card 200-1 and a second port card 200-2 electrically coupled to the first port card 200-1. For example, the method 940 is performed in a switch 102 with a two-stage switching architecture 300 (FIG. 3), in which the port cards 200-1 and 200-2 are electrically coupled via a backplane 302. In another example, the method 940 is performed in a switch 102 with a three-stage switching architecture 400 (FIG. 4), in which the port cards 200-1 and 200-2 are electrically coupled via a middle-stage switching card 402. The first port card 200-1 includes a port CDR circuit 202, backplane CDR circuitry 216, and a cross-bar switch 206 coupling the backplane CDR circuitry 216 with the port CDR circuit 202, as shown in FIG. 2.

In the method 940, a first test pattern is transmitted (944) along a first data path segment from the backplane CDR circuitry 216 to the port CDR circuit 202. In some embodiments, transmitting the first test pattern includes receiving (946) the first test pattern from the second port card 200-2 at the backplane CDR circuitry 216 and forwarding the first test pattern along the first data path segment to the port CDR circuit 202, as shown for example in FIG. 7B.

The first test pattern is verified (952) at the port CDR circuit 202, to determine whether it satisfies a predefined criterion. This verification is performed, for example, using test pattern checking circuitry 530 and/or eye analyzer circuitry 510 (FIG. 5A) associated with the port CDR circuit 202. In response to a determination that the first test pattern as received at the port CDR circuit 202 does not satisfy the predefined criterion, an adjustable parameter of a component of the first data path segment is tuned (954). The operations 944, 952, and 954 are repeated (e.g., in accordance with the process 800, FIG. 8) until a determination is made in operation 952 that the test pattern as received at the port CDR circuit 202 satisfies the predefined criterion.

In some embodiments, while transmitting (944) the first test pattern, a second test pattern is transmitted (948) along a second data path segment originating at the port CDR circuit 202 and passing through the cross-bar switch 206. The second test pattern is forwarded (950) from the first port card 200-1 to the second port card 200-2, while the first port card 200-1 receives the first test pattern from the second port card 200-2, as shown for example in FIG. 7B.

Figure 9D:
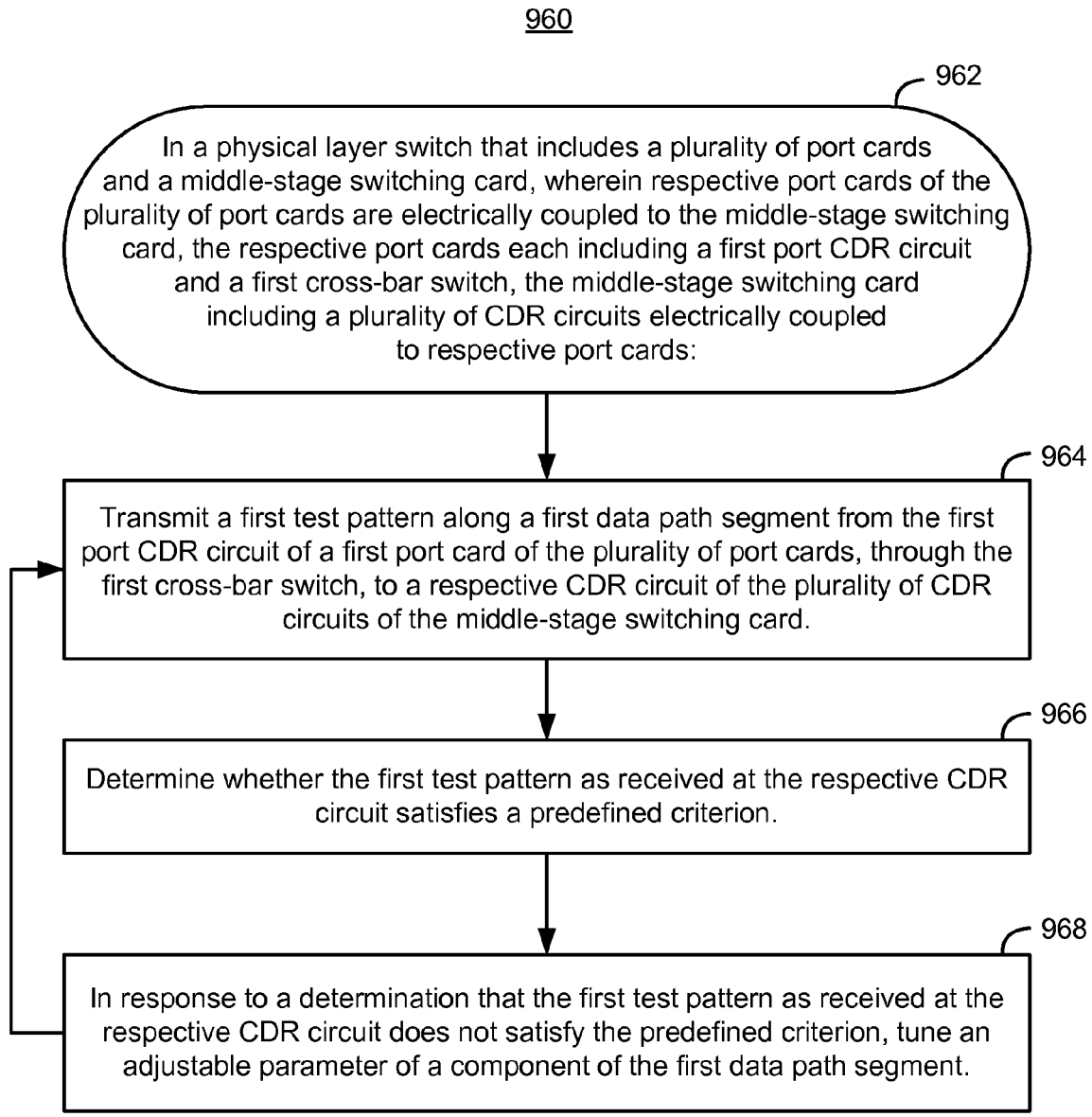

FIG. 9D is a flow diagram illustrating a method 960 of calibrating a network switch in accordance with some embodiments. The method 960 is performed (962) in a physical layer switch 102 (or alternatively in a layer 2, layer 3, layer 4, or multi-layer switch) with a 3-stage switching architecture 400 (FIG. 4) that includes a plurality of port cards 200-1 through 200-N and a middle-stage switching card 402. Respective port cards 200 of the plurality of port cards 200-1 through 200-N are electrically coupled to the middle-stage switching card 402. The respective port cards 200 each include a first port CDR circuit 202 and a first cross-bar switch 206 (FIG. 2); the middle-stage switching card includes a plurality of CDR circuits 404-1 through 404-N electrically coupled to respective port cards 200.

In the method 960, a first test pattern (e.g., a PRBS generated by a test pattern generation circuit 526 or a framed test pattern generated by a test pattern generation circuit 528, FIG. 5A) is transmitted (964) along a first data path segment from the first port CDR circuit 202 of a first port card 200-1 of the plurality of port cards, through the first cross-bar switch 206, to a respective CDR circuit 404-1 of the plurality of CDR circuits of the middle-stage switching card 402. A determination is made (966) as to whether the first test pattern as received at the respective CDR circuit 404-1 satisfies a predefined criterion (e.g., using test pattern checking circuitry 530 and/or eye analyzer circuitry 510 (FIG. 5B) associated with the respective CDR circuit 404-1). In response to a determination that the first test pattern as received at the respective CDR circuit 404-1 does not satisfy the predefined criterion, an adjustable parameter of a component of the first data path segment is tuned (968).

The methods 900, 920, 940, and 960 thus allow for automated calibration of a network switch, to ensure that signal transmissions through the switch satisfy quality requirements (e.g., meet a specified BER). While the methods 900, 920, 940, and 960 include a number of operations that appear to occur in a specific order, it should be apparent that the methods 900, 920, 940, and 960 can include more or fewer operations, which can be executed serially or in parallel. An order of two or more operations may be changed and two or more operations may be combined into a single operation. Methods similar to the method 960 may be performed for other data path segments in a switch with a three-stage switching architecture 400.

In some embodiments, calibration (e.g., in accordance with one or more of the methods 800, 900, 920, 940, and 960) is performed upon start-up of the switch (e.g., the physical layer switch 102) and may subsequently performed periodically (e.g., by placing the switch in a corresponding test mode).

Furthermore, unused data path segments may be calibrated in the background during regular operation of the switch.

Figure 10:
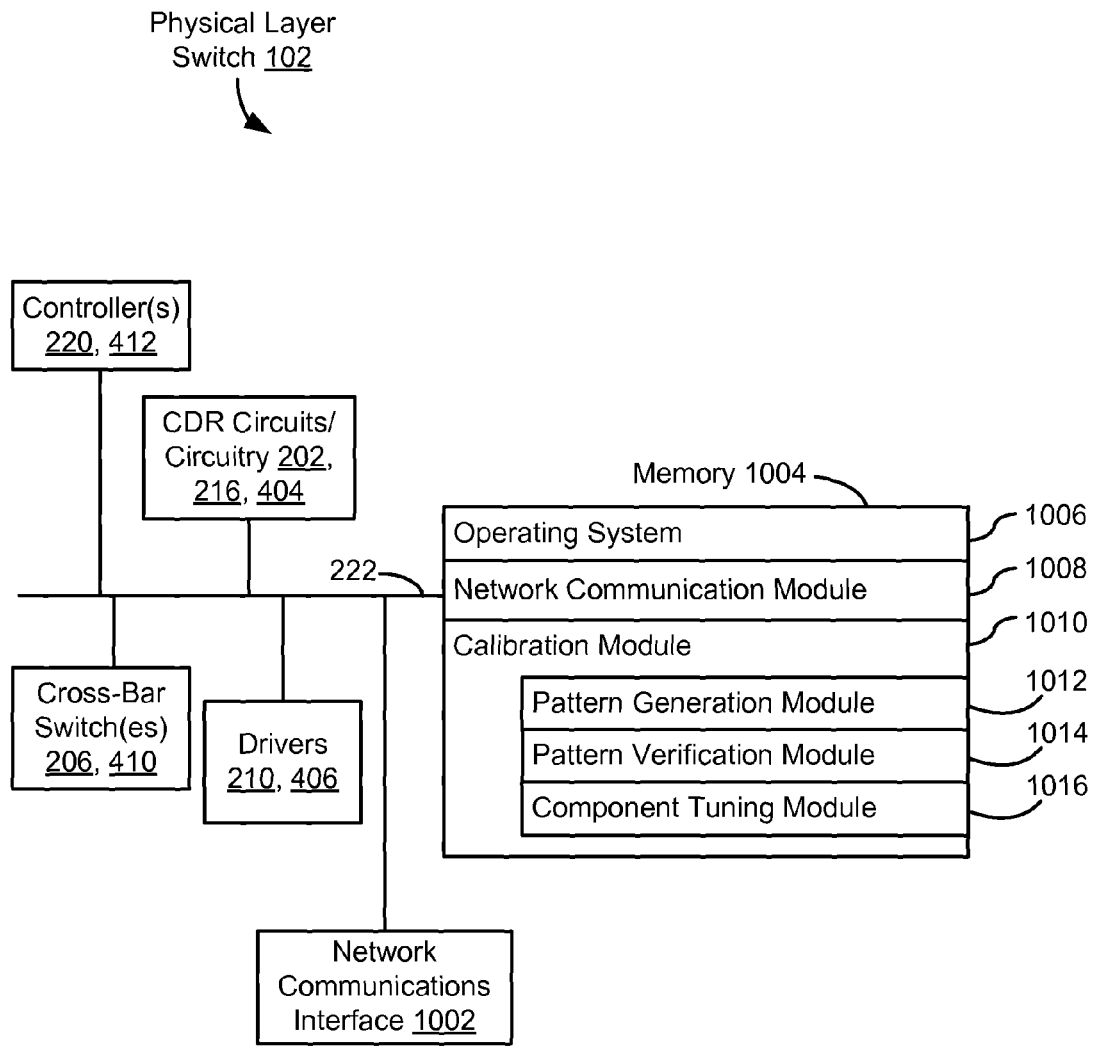
FIG. 10 is a block diagram illustrating a physical layer switch in accordance with some embodiments.

FIG. 10 is a block diagram illustrating a physical layer switch 102 (e.g., with a single port card 200 (FIG. 2), two-stage switching architecture 300 (FIG. 3), or three-stage switching architecture 400 (FIG. 4)) in accordance with some embodiments. The physical layer switch 102 includes all or a portion of the following components: one or more controllers 220/412, CDR circuits/circuitry 202/216/404, cross-bar switches 206/410, and drivers 210/406. The physical layer switch 102 also includes one or more network or other communications interfaces 1002 (e.g., a control port 122, FIG. 1), memory 1004, and a control network 222 for interconnecting the components. The memory 1004 may include high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 1004 may optionally include one or more storage devices remotely located from the controller(s) 220/412. Alternatively, all or a portion of the memory 1004 is embedded in the controller(s) 220/412. Memory 1004, or alternately non-volatile memory device(s) within memory 1004, includes a non-transitory computer-readable storage medium. In some embodiments, the memory 1004 stores the following programs, modules and data structures, or a subset thereof:

- an operating system 1006 that includes procedures for handling various basic system services and for performing hardware dependent tasks;
- a network communication module 1008 that is used for connecting the physical layer switch 102 to external devices (e.g., the computer 104, FIG. 1) via the one or more network communication interfaces 1002; and
- a calibration module 1010 for calibrating or tuning the physical layer switch 102.

In some embodiments, the calibration module 1010 includes a pattern generation module 1012 to control generation of test patterns by the test pattern generation circuitry 524 (FIG. 5A), a pattern verification module 1014 to control verification of test patterns by the test pattern checking circuitry 530 (FIGS. 5A-5B), and a component tuning module 1016 to issue commands to components to change the values of adjustable parameters (e.g., by storing corresponding codes in registers 508 and 612, FIGS. 5A-6). In some embodiments, the calibration module 1010 includes instructions for performing all or a portion of the methods 800 (FIG. 8), 900 (FIG. 9A), 920 (FIG. 9B), 940 (FIG. 9C), and/or 960 (FIG. 9D).

Each of the above identified elements in FIG. 10 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 1004 may store a subset of the modules and data structures identified above. Furthermore, memory 1004 may store additional modules and data structures not described above. In some embodiments, a layer 2, layer 3, layer 4, or multi-layer switch has a block architecture corresponding to the architecture of FIG. 10, including one or more controllers and a memory 1004 with instructions for performing all or a portion of the methods 800 (FIG. 8), 900 (FIG. 9A), 920 (FIG. 9B), 940 (FIG. 9C), and/or 960 (FIG. 9D).

The foregoing description, for purpose of explanation, has been described with reference to specific embodiments. However, the illustrative discussions above are not intended to be exhaustive or to limit the inventions to the precise forms disclosed. Many modifications and variations are possible in view of the above teachings. The embodiments were chosen and described in order to best explain the principles of the inventions and their practical applications, to thereby enable others skilled in the art to best utilize the inventions and various embodiments with various modifications as are suited to the particular use contemplated.

What is claimed is:

1. A network switch, comprising:
    a first clock-and-data-recovery (CDR) circuit;
    a second CDR circuit;
    a cross-bar switch electrically coupling the first CDR circuit and the second CDR circuit, the cross-bar switch configured to provide switching functionality among a plurality of inputs and outputs, and configured to create a dedicated communication path between the first CDR circuit and the second CDR circuit;
    a test pattern generation circuit electrically coupled to the first CDR circuit and configured to generate a test pattern and transmit the test pattern from the first CDR circuit to the second CDR circuit via the cross-bar switch;
    a test pattern checking circuit electrically coupled to the second CDR circuit, the test pattern checking circuit configured to verify the test pattern received at the second CDR circuit; and
    a controller configured to provide, based on the test pattern received at the second CDR circuit, one or more commands to tune the cross-bar switch.

2. The network switch of claim 1, further comprising one or more ports electrically coupled to the first CDR circuit, wherein the first CDR circuit is configured to receive first signals from the one or more ports electrically coupled to the first CDR circuit, regenerate the received first signals as first regenerated signals, and transmit the first regenerated signals.

3. The network switch of claim 1, further comprising one or more ports electrically coupled to the second CDR circuit, wherein the second CDR circuit is configured to receive second signals from the one or more ports electrically coupled to the second CDR circuit, regenerate the received second signals as second regenerated signals, and transmit the second regenerated signals.

4. A network switch, comprising:
    a backplane; and
    a plurality of port cards connected to the backplane, each comprising:
        a plurality of ports;
        a cross-bar switch configured to provide switching functionality among a plurality of inputs and outputs;
        a port clock-and-data-recovery (CDR) circuit electrically coupled between the plurality of ports and the cross-bar switch and configured to: receive first signals from the plurality of ports, regenerate the received first signals as first regenerated signals, transmit the first regenerated signals to the cross-bar switch, receive second signals from the cross-bar switch, regenerate the received second signals as second regenerated signals, and transmit the second regenerated signals to the plurality of ports;
        a test pattern generation circuit electrically coupled to the port CDR circuit and configured to generate a test pattern and transmit the test pattern from the port CDR circuit to the cross-bar switch;

a backplane CDR circuit electrically coupled to the cross-bar switch and configured to receive third signals via the backplane, regenerate the received third signals as third regenerated signals, and transmit the third regenerated signals to the cross-bar switch;

a test pattern checking circuit electrically coupled with the backplane CDR circuit and configured to verify test patterns received at the backplane CDR circuit from other port cards of the plurality of port cards; and a controller configured to provide, based on the test pattern received at the backplane CDR circuit, one or more commands to tune the cross-bar switch.

5. A network switch, comprising:
a middle-stage switching card; and
a plurality of port cards electrically coupled with the middle-stage switching card, each comprising:
a plurality of ports;
a first cross-bar switch configured to provide switching functionality among a plurality of inputs and outputs;
a port clock-and-data-recovery (CDR) circuit electrically coupled between the plurality of ports and the first cross-bar switch and configured to forward signals from the plurality of ports to the first cross-bar switch and forward signals from the first cross-bar switch to the plurality of ports;
a test pattern generation circuit electrically coupled with the first port CDR circuit and configured to generate a test pattern and transmit the test pattern from the port CDR circuit to the first cross-bar switch;
a driver circuit electrically coupled to the first cross-bar switch and configured to forward signals and the test pattern from the first cross-bar switch to the middle-stage switching card;
a CDR circuit electrically coupled to the first cross-bar switch and configured to forward signals from the middle-stage switching card to the first cross-bar switch;
a test pattern checking circuit electrically coupled with the CDR circuit and configured to verify test patterns received at the CDR circuit from the middle-stage switching card; and
a controller configured to provide, based on the test pattern received at the CDR circuit, one or more commands to tune the cross-bar switch;
wherein the middle-stage switching card comprises:
a second cross-bar switch; and
a plurality of CDR circuits, each electrically coupled to the second cross-bar switch and configured to forward signals from a respective port card to the second cross-bar switch.

6. The network switch of claim 5, wherein the port CDR circuit is configured to: receive first signals from the plurality of ports, regenerate the received first signals as first regenerated signals, transmit the first regenerated signals to the first cross-bar switch, receive second signals from the first cross-bar switch, regenerate the received second signals as second regenerated signals, and transmit the second regenerated signals to the plurality of ports.

7. The network switch of claim 5, wherein the CDR circuit is configured to receive third signals from the middle-stage switching card, regenerate the received third signals as third regenerated signals, and transmit the third regenerated signals to the first cross-bar switch.

8. The network switch of claim 5, wherein each CDR circuit of the plurality of CDR circuits in the middle-stage switching card is configured to receive fourth signals from the respective port card, regenerate the received fourth signals as fourth regenerated signals, and transmit the fourth regenerated signals to the second cross-bar switch.

9. A method of calibrating a network switch, comprising:
transmitting a test pattern along a data path segment from a first clock-and-data-recovery (CDR) circuit, through a cross-bar switch, to a second CDR circuit, wherein the cross-bar switch is configured to provide switching functionality among a plurality of inputs and outputs;
determining whether the test pattern as received at the second CDR circuit satisfies a predefined criterion; and,
in response to a determination that the test pattern as received at the second CDR circuit does not satisfy the predefined criterion, tuning an adjustable parameter of one or more components, including the cross-bar switch, of the data path segment.

10. The method of claim 9, wherein the first CDR circuit is located within the network switch and configured to receive first signals, regenerate the received first signals as first regenerated signals, and transmit the first regenerated signals.

11. The method of claim 9, wherein the second CDR circuit is located within the network switch and configured to regenerate second signals, regenerate the received second signals as second regenerated signals, and transmit the second regenerated signals.

12. The method of claim 9, wherein the one or more components comprise the first CDR circuit.

13. The method of claim 9, wherein the one or more components comprise the second CDR circuit.

14. A method of calibrating a network switch, the switch comprising a backplane and a plurality of port cards, wherein each port card of the plurality of port cards is connected to the backplane and comprises a port CDR circuit, backplane CDR circuit, and a cross-bar switch configured to provide switching functionality among a plurality of inputs and outputs, thereby coupling the backplane CDR circuit with the port CDR circuit, the method comprising:
transmitting a test pattern along a data path segment from the port CDR circuit of a first port card of the plurality of port cards to the backplane CDR circuit of a second port card of the plurality of port cards;
determining whether the test pattern as received at the backplane CDR circuit of the second port card satisfies a predefined criterion; and,
in response to a determination that the test pattern as received at the backplane CDR of the second port card does not satisfy the predefined criterion, tuning an adjustable parameter of one or more components, including the cross-bar switch of the first port card, of the data path segment.

15. The method of claim 14, wherein the port CDR circuit of the first port card is configured to receive first signals, regenerate the received first signals as first regenerated signals, and transmit the first regenerated signals.

16. The method of claim 14, wherein the backplane CDR circuit is configured to receive second signals, regenerate the received second signals as second regenerated signals, and transmit the second regenerated signals.

17. A method of calibrating a network switch, the switch comprising a plurality of port cards and a middle-stage switching card, wherein respective port cards of the plurality of port cards are electrically coupled to the middle-stage switching card, the respective port cards each comprising a port CDR circuit and a cross-bar switch, the middle-stage switching card comprising a plurality of CDR circuits electrically coupled to respective port cards, the method comprising:

transmitting a test pattern along a data path segment from the port CDR circuit of a port card of the plurality of port cards, through the cross-bar switch, to a respective CDR circuit of the plurality of CDR circuits of the middle-stage switching card, wherein the cross-bar switch is configured to provide switching functionality among a plurality of inputs and outputs;

determining whether the test pattern as received at the respective CDR circuit satisfies a predefined criterion; and, in response to a determination that the test pattern as received at the respective CDR circuit does not satisfy the predefined criterion, tuning an adjustable parameter of one or more components, including the cross-bar switch, of the data path segment.

18. The method of claim 17, wherein the one or more components comprise the port CDR circuit.

19. The method of claim 17, wherein the one or more components comprise the respective CDR circuit.

\* \* \* \* \*